(12) United States Patent
Oshiyama et al.

(10) Patent No.: US 10,027,846 B2
(45) Date of Patent: Jul. 17, 2018

(54) LIGHT GUIDE BODY, LIGHT SOURCE DEVICE AND IMAGE READING DEVICE

(71) Applicant: Mitsubishi Electric Corporation, Chiyoda-ku (JP)

(72) Inventors: Fumika Oshiyama, Chiyoda-ku (JP); Taku Matsuzawa, Chiyoda-ku (JP); Toru Aramaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/549,393

(22) PCT Filed: Feb. 19, 2016

(86) PCT No.: PCT/JP2016/054959
§ 371 (c)(1),
(2) Date: Aug. 8, 2017

(87) PCT Pub. No.: WO2016/133216
PCT Pub. Date: Aug. 25, 2016

(65) Prior Publication Data
US 2018/0041661 A1 Feb. 8, 2018

(30) Foreign Application Priority Data
Feb. 20, 2015 (JP) ................................ 2015-031335

(51) Int. Cl.
*H04N 1/04* (2006.01)
*H04N 1/40* (2006.01)
(Continued)

(52) U.S. Cl.
CPC ........... *H04N 1/40056* (2013.01); *G02B 6/10* (2013.01); *G02B 2006/0098* (2013.01)

(58) Field of Classification Search
CPC ................. H04N 1/40056; G02B 6/10; G02B 2006/0098
(Continued)

(56) References Cited

U.S. PATENT DOCUMENTS 6,017,130 A 1/2000 Saito et al.
6,204,938 B1 * 3/2001 Horiuchi .............. G02B 6/0055
358/475
(Continued)

FOREIGN PATENT DOCUMENTS

JP 10-126581 A 5/1998
JP 2006-120639 A 5/2006
(Continued)

OTHER PUBLICATIONS

International Search Report dated May 24, 2016 in PCT/JP2016/054959 filed Feb. 19, 2016.
(Continued)

*Primary Examiner* — Cheukfan Lee
(74) *Attorney, Agent, or Firm* — Oblon, McClelland, Maier & Neustadt, L.L.P.

(57) ABSTRACT

A light guide body (2) includes a light guide main body (21), a band region (4), and radial microstructures (5). The light guide main body (21) is columnar, and light enters the light guide main body (21) from at least one end portion (3). The band region (4) is formed extending in the lengthwise direction of a portion of a circumferential surface of the light guide main body (21). The radial microstructures (5) are arranged in the band region (4) and are formed as microstructures that each have protruding parts extending radially in at least three directions in a band region portion from a reference point.

18 Claims, 22 Drawing Sheets

(51) Int. Cl.
*G02B 6/10* (2006.01)
*G02B 6/00* (2006.01)

(58) Field of Classification Search
USPC .................. 358/475, 509, 484, 473, 474
See application file for complete search history.

(56) References Cited

U.S. PATENT DOCUMENTS

| | | | | |
|---|---|---|---|---|
| 7,478,942 B2* | 1/2009 | Kim | ............ | G02B 6/0036 349/65 |
| 7,555,194 B2* | 6/2009 | Ikeda | ............ | H04N 1/02815 359/475 |
| 7,682,063 B2* | 3/2010 | Chen | ............ | F21V 7/22 362/330 |
| 7,812,304 B2* | 10/2010 | Ikeda | ............ | G02B 6/0036 250/205 |
| 8,687,937 B2* | 4/2014 | Tsao | ............ | G02B 6/0055 362/558 |
| 9,709,728 B2* | 7/2017 | Ouchi | ............ | G02B 6/0096 |
| 9,897,266 B2* | 2/2018 | Moon | ............ | F21K 9/61 |
| 2002/0041349 A1* | 4/2002 | Ohkawa | ............ | G02B 6/0036 349/65 |
| 2003/0169384 A1* | 9/2003 | Ohkawa | ............ | G02B 6/0021 349/65 |
| 2006/0165370 A1* | 7/2006 | Nemoto | ............ | G02B 6/0038 385/146 |
| 2009/0015883 A1 | 1/2009 | Kim | | |
| 2009/0015884 A1 | 1/2009 | Cho et al. | | |
| 2009/0015886 A1 | 1/2009 | Kim et al. | | |
| 2009/0218525 A1 | 9/2009 | Ikeda et al. | | |
| 2010/0014315 A1 | 1/2010 | Fujimoto | | |
| 2010/0033988 A1* | 2/2010 | Chiu | ............ | G02B 6/001 362/619 |
| 2010/0214803 A1* | 8/2010 | Sakamoto | ............ | G02B 6/0038 362/612 |
| 2012/0176786 A1* | 7/2012 | Presley | ............ | G02F 1/133605 362/225 |
| 2013/0094243 A1* | 4/2013 | Wu | ............ | G02B 6/0036 362/606 |
| 2014/0355290 A1 | 12/2014 | Ouchi | | |

FOREIGN PATENT DOCUMENTS

| | | |
|---|---|---|
| JP | 2009-22007 A | 1/2009 |
| JP | 2014-235881 A | 12/2014 |
| JP | 2014-235882 A | 12/2014 |
| WO | 2006/120932 A1 | 11/2006 |
| WO | 2008/108210 A1 | 9/2008 |

OTHER PUBLICATIONS

Japanese Office Action dated Nov. 1, 2016 in JP 2016-554518 (with Partial English Translation).
Japanese Final Office Action dated Jan. 31, 2017 in JP 2016-554518 (with Partial English Translation).

* cited by examiner

COMPARATIVE EXAMPLE FIG. 19
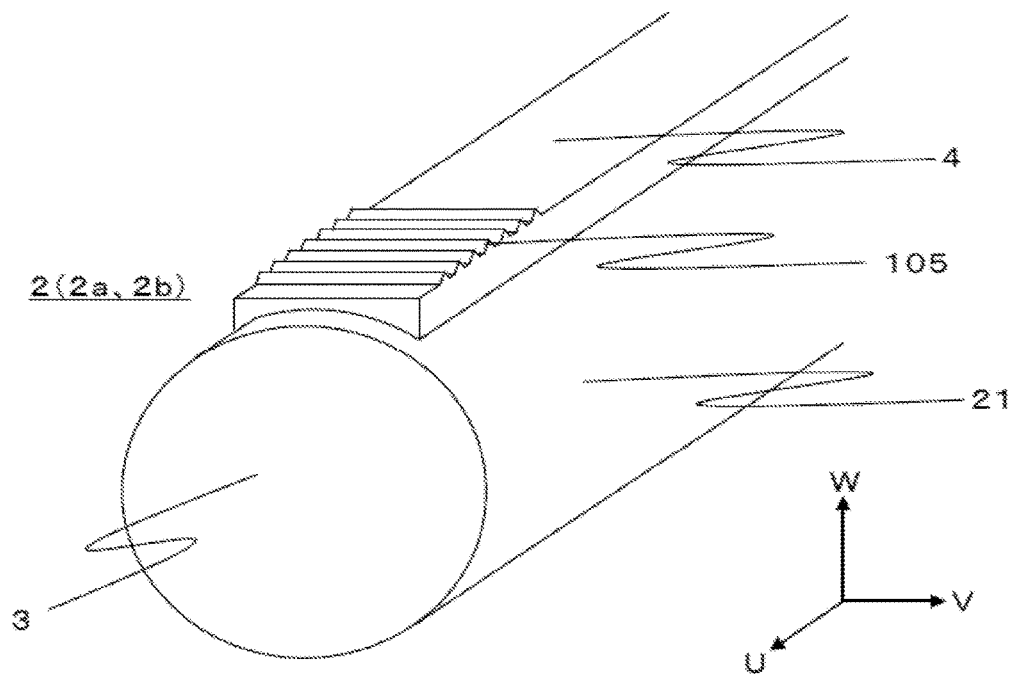
COMPARATIVE EXAMPLE FIG. 20
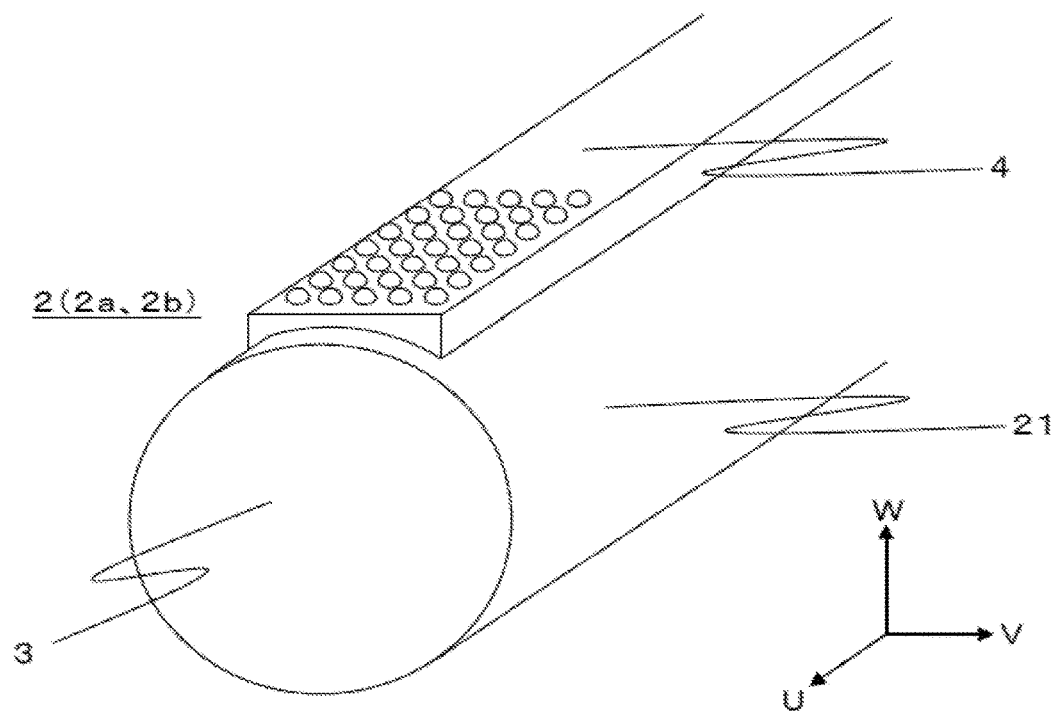

COMPARATIVE EXAMPLE    FIG. 21
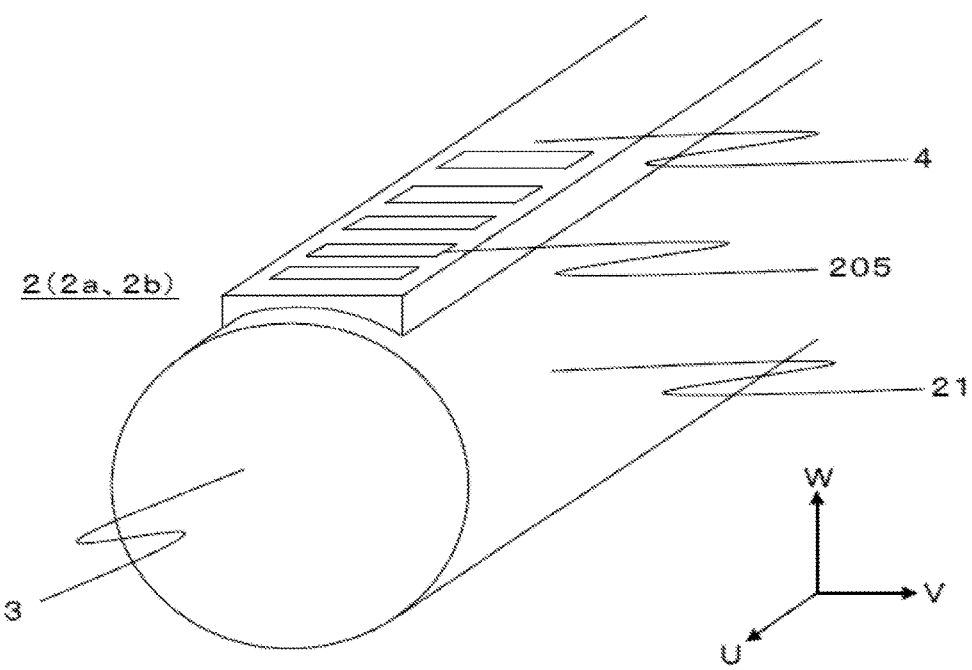
FIG. 22
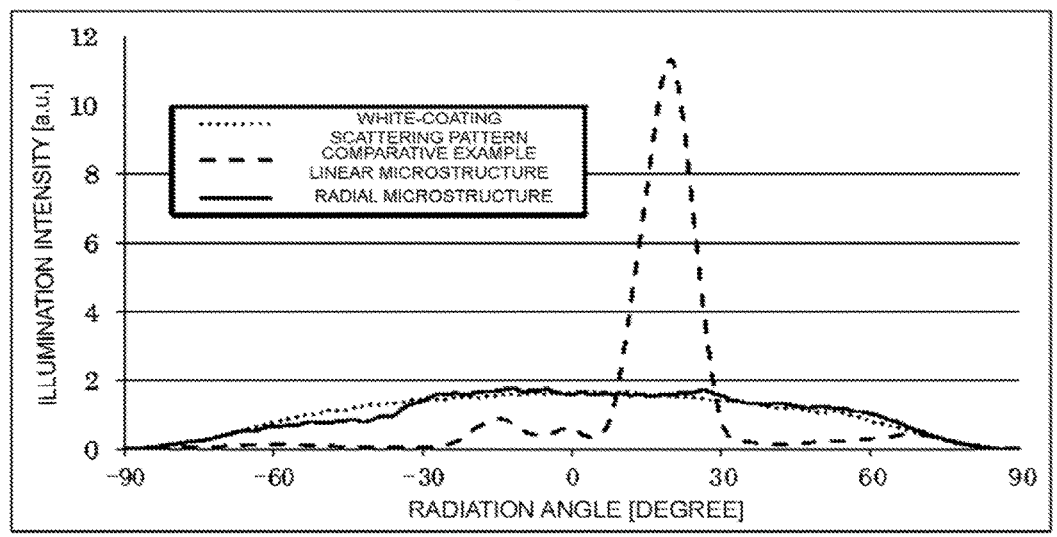

TIME t

TIME (SINGLE LINE SECTION)

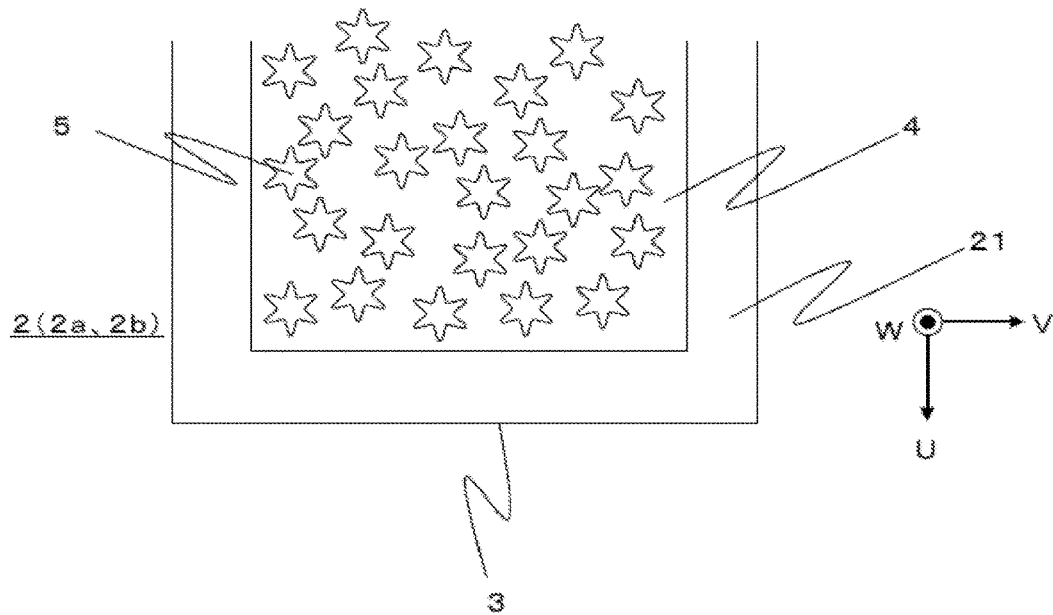
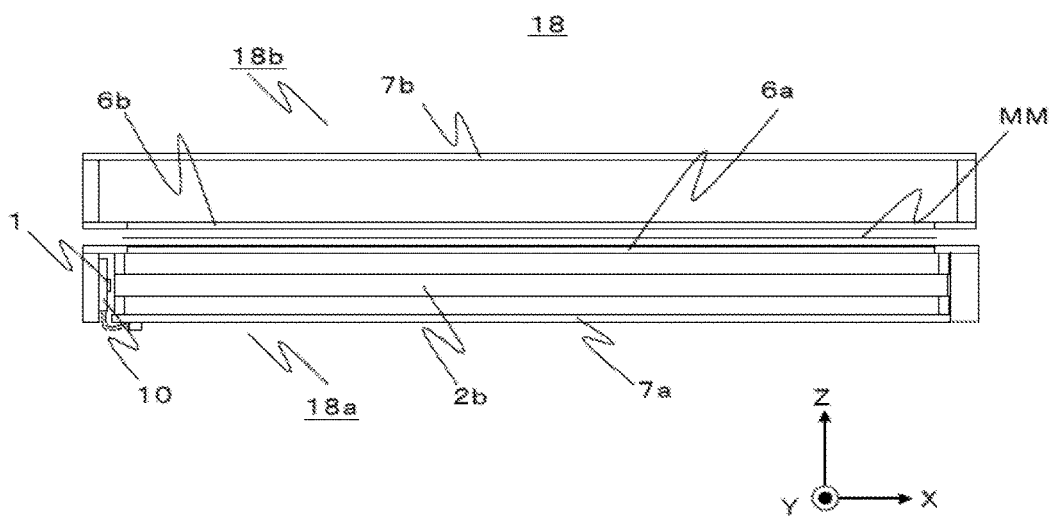

LIGHT GUIDE BODY, LIGHT SOURCE DEVICE AND IMAGE READING DEVICE

TECHNICAL FIELD

The present disclosure relates to a light guide body, a light source device and the image reading device used in an image reading device, particularly a fax machine, a copier, a financial terminal, and the like.

BACKGROUND ART

An image reading device is used in devices such as a fax machine, a copier, and a financial terminal, and the image reading device performs duplicating of original copies, distinguishing authenticity of paper items, and distinguishing degree of circulation-induced wear. In order to irradiate a reading target object with light, the image reading device includes a light guide body that transmits light that enters the light guide body from a light source element.

The image reading device disclosed in Patent Literature 1 includes a linear light source device. The linear light source device includes a columnar plastic light guide body and a light source element that emits light to the light guide body. A band region is formed in a portion of a circumference surface of the light guide body, and recessed sections or protruding sections are formed extending linearly in the width direction of the band region. Light entering from an end portion of the light guide body is emitted from a region opposite to the band region.

A lighting device including a light guide body is disclosed in Patent Literature 2. In a portion of a circumferential surface of the light guide body, a light scattering member is formed by attaching of a film, printing of a coating, and the like. The light entering the light guide body from a light guide body end portion is emitted from a region opposite to a light scattering portion.

The light guide body disclosed in Patent Literatures 3 and 4 includes a reflection surface in which are formed light reflection members. The light reflection member is formed with a semi-ellipse shape projecting in an emission plane of the light guide body. Shape of the light reflection member varies with the position of arrangement in a main scanning direction.

CITATION LIST

Patent Literature

Patent Literature 1: International Publication No. WO 2008/108210
Patent Literature 2: Unexamined Japanese Patent Application Kokai Publication No. H10-126581
Patent Literature 3: Unexamined Japanese Patent Application Kokai Publication No. 2014-235881
Patent Literature 4: Unexamined Japanese Patent Application Kokai Publication No. 2014-235882

SUMMARY OF INVENTION

Technical Problem

Due to forming of the recessed sections or protruding sections linearly in the width direction, the light guide body disclosed in Patent Literature 1 has a problem in that the emitted light is difficult to spread in the width direction. Further, accuracy is required during assembly with the image reading device, and the assembly process is laborious. Further, due to the occurrence of bias also in the illumination angle in the lengthwise direction, shadows occur during scanning of an original copy that has protuberances and recesses.

The light guide body disclosed in Patent Literature 2 has a problem in that molding of the scattering member with good accuracy is difficult, and uniform characteristics are difficult to obtain. Further, processing is required for the scattering member after molding by injection molding and the like, and the number of processing steps increases. Further, for wideband applications, cost increases due to the requirement to form the scattering member by a multi-color mixed paint or film.

The light guide body disclosed in Patent Literatures 3 and 4 has a problem in that, although the light guide body is capable of uniformity in the illumination distribution of direct light and indirect light at each sub-scanning direction position, the light guide body is not capable of uniformity of the illumination distribution in the main scanning direction.

The objective of the present disclosure is to solve such problems by obtaining a light guide body, a light source device, and an image reading device that enable uniform illumination of a reading target object.

Solution to Problem

In order to attain the aforementioned objective, a first aspect of a light guide body according to the present disclosure includes:
a columnar main body into which light enters from at least one end portion;
a band region portion formed extending in a lengthwise direction in a portion of a circumferential surface of the main body; and
a plurality of light reflection members arranged in the band region portion, each light reflection member of the plurality of light reflection members being formed by a microstructure comprising protruding parts extending radially in at least three directions from a reference point in the band region portion.

Advantageous Effects of Invention

According to the present disclosure, the reading target object can be uniformly illuminated.

BRIEF DESCRIPTION OF DRAWINGS

FIG. 19 is a tilted perspective view of a light guide body 2 of a comparative example;

FIG. 20 is a tilted perspective view of a light guide body 2 of another comparative example;

FIG. 21 is a tilted perspective view of a light guide body 2 of yet another comparative example;

FIG. 22 is a chart illustrating a relationship between radiation angle and illumination intensity of the illumination light for the light guide body 2 according to Embodiment 1;

FIG. 26B is an upper surface view of another light guide body 2 according to Embodiment 2;

FIG. 27 is a cross-sectional drawing of an image reading device according to Embodiment 3;

DESCRIPTION OF EMBODIMENTS

Embodiment 1

Figure 1:
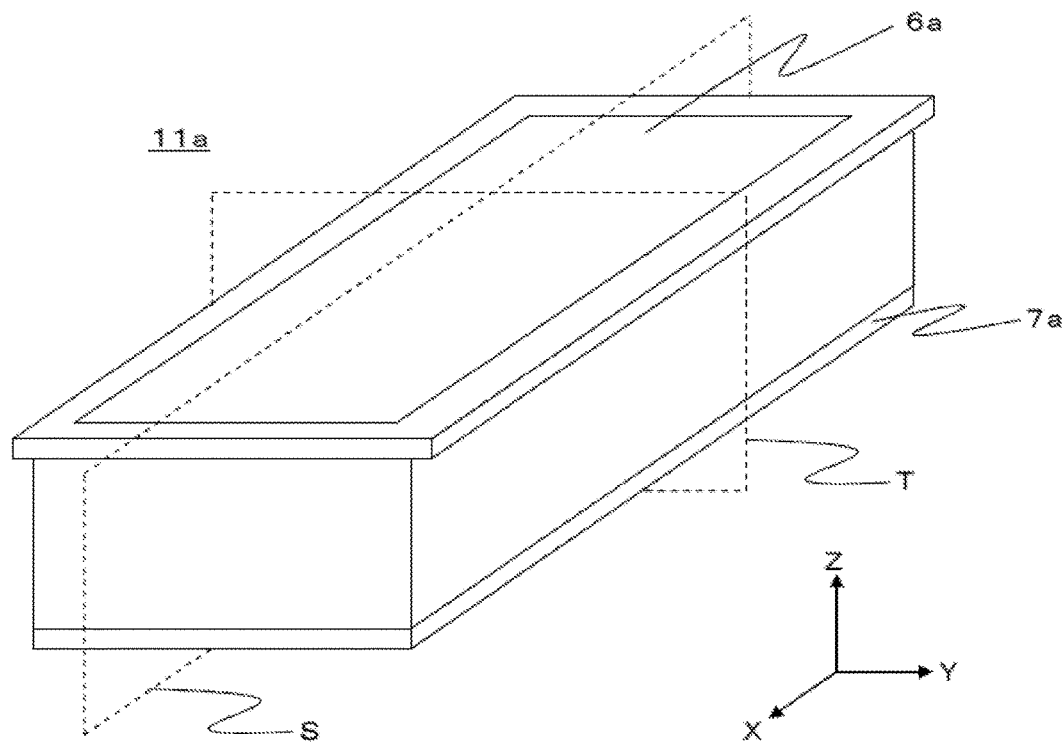
FIG. 1 is a titled perspective view of an image reading device according to Embodiment 1.

FIGS. 1 to 24 are used for description of Embodiment 1. An image reading device according to embodiments is described hereinafter as the "image reading device 11". FIG. 1 is a tilted perspective view of the image reading device according to Embodiment 1. The image reading device 11 is a contact image sensor (CIS). The X-axis direction illustrated in FIG. 1 is taken to mean the main scanning direction of the image reading device 11. The Y-axis direction is taken to mean the sub-scanning direction, which is perpendicular to the main scanning direction, of the image reading device 11. The sub-scanning direction is the conveyance direction in which a reading target object MM is conveyed. The Z-axis direction is the direction of the axis perpendicular to the X-Y plane defined by the X axis and Y axis. The Z-axis direction is the optical axis direction of imaging optical systems 9a and 9b of the image reading device 11. The Z-axis direction is the direction related to the focal-point depth of the imaging optical systems 9a and 9b, and this direction is also termed the "reading depth direction".

Figure 2A:
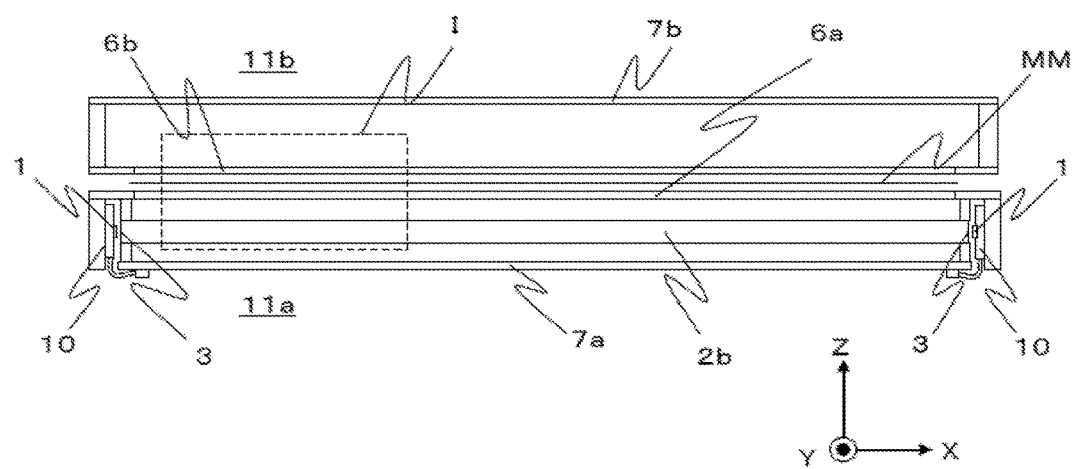
FIG. 2A is a cross-sectional drawing of the image reading device according to Embodiment 1.

FIG. 2A is a cross-sectional drawing of the image reading device 11 taken along a virtual plane S that is a plane parallel to the Z-X plane defined by the Z axis and X axis as illustrated in FIG. 1. In particular, the virtual plane S is a cross section of a portion that intersects one of light source elements 1 arranged on a light source element board 10. The image reading device 11 includes an image reading device 11b that reads light emitted from a light guide body 2a and passing through the reading target object MM, and an image reading device 11a that reads light emitted from a light guide body 2b and passing through the reading target object MM. In a plane parallel to the Y-Z plane defined by the Y axis and Z axis, the light source elements 1 are arranged on the light source element board 10 at an end surface 3 and an opposing end surface of the light guide body 2b. The reading target object MM is the illuminated object, which includes objects such as an original copy, book, magazine, written document (general written document), picture, photograph, slide film, film, banknote, security, substrate, electronic component, and fingerprint.

Figure 2B:
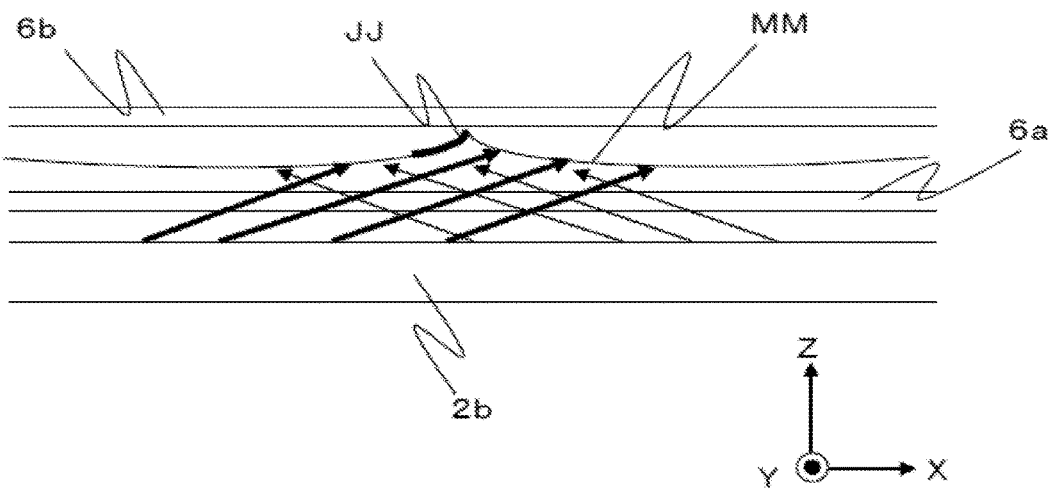
FIG. 2B is a cross-sectional drawing of the image reading device according to Embodiment 1.

FIG. 2B is a magnified view within a dashed-line region 1 illustrated in FIG. 2A and illustrates a case in which there are concavities and protuberances in the reading target object MM. The arrows indicate the directions of light rays emitted from the light guide body 2. When the emission angle is biased as in the figure, a portion not struck by light, such as the region JJ indicated by a thick line, may be generated on the reading target object MM, and shadows may occur in the scanned image.

Figure 3:
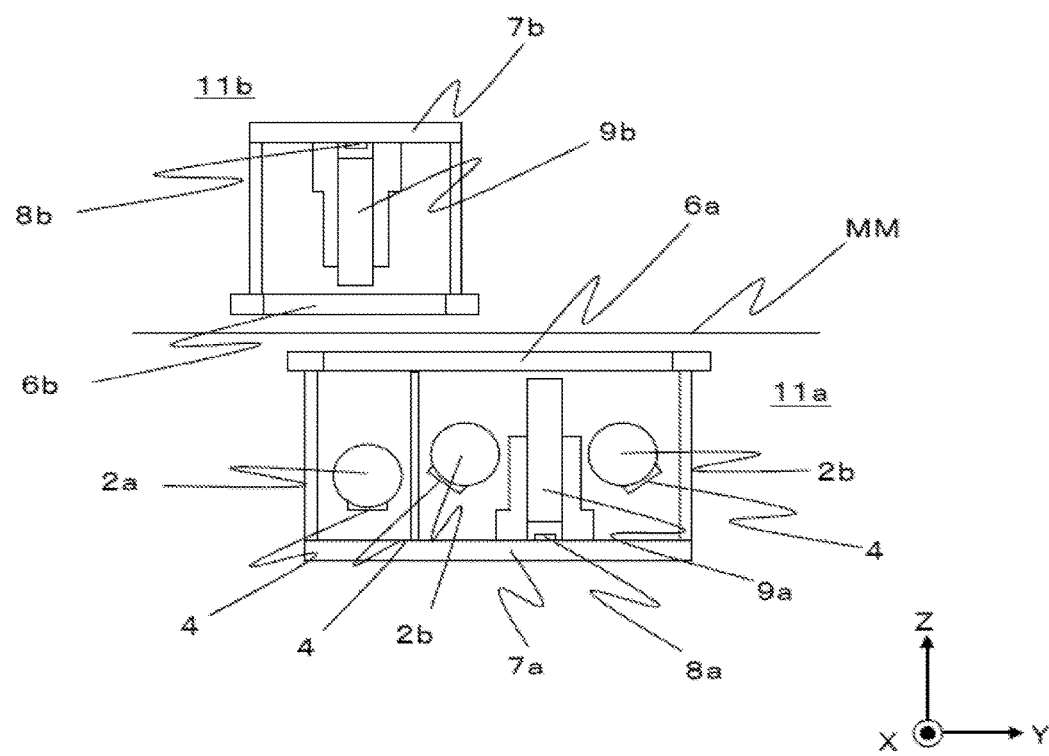
FIG. 3 is a cross-sectional drawing of the image reading device according to Embodiment 1.

FIG. 3 is a cross-sectional drawing of the image reading device 11 at a virtual plane T that is a plane parallel to the Z-Y plane defined by the Z axis and Y axis shown in FIG. 1. Light emitted from the light guide body 2a passes through a cover member 6a and passes through the reading target object MM. Further, the light passes through a cover member 6b, through an imaging optical system 9b, and is focused on a line sensor unit 8b. The light emitted from the light guide body 2b passes through the cover member 6a, reflects by the reading target object MM, again passes through the cover member 6a, passes through an imaging optical system 9a, and is focused on a line sensor 8a. Hereinafter, the light guide bodies 2a and 2b may be collectively termed the "light guide body 2". Similar terminology is used for other elements described by appending the letters "a" and "b".

The imaging optical systems 9a and 9b include a plurality of lenses arranged along the main scanning direction, and are lens arrays that focus reflected light on the line sensor units 8a and 8b, respectively. The imaging optical system 9 may also be termed the "lens array unit 9". The description below describes an example of a case in which the imaging optical system 9 includes multiple rod lenses arranged in an array pattern, that is to say, includes a rod lens array unit that sandwiches a rod lens array between plates. However, a different lens array may be used, such as a micro-lens array, which is an erect non-magnifying optical system in the same manner as the rod lens array. When the micro-lens array is used, the imaging optical system 9 is a plurality of micro-lenses, that is to say, a micro lens array unit that sandwiches the micro-lens array between plates.

The imaging optical system 9 is disposed so that the optical axis is perpendicular to the surface of the original copy, which is the reading surface of the reading target object MM, and the imaging optical system 9 functions by focusing the transmitted light or reflected light from the reading target object MM on a sensor integrated circuit (IC) 8, which is a photoreceptor. The sensor IC 8 includes a line sensor unit 8 formed by a plurality of photoreceptor elements arranged along the main scanning direction at a surface of a board 7 in one direction. The line sensor unit 8 may also be termed the "sensor array unit 8". The sensor IC 8 receives light focused by the imaging optical system 9, photo-electrically converts the received light, and outputs an electrical signal. A photoreceptor unit is mounted in the sensor IC 8, and the photoreceptor unit includes components such as a semiconductor chip, as well as components such as a drive circuit. These components are disposed at the surface in the one direction, at a surface in another direction, and at the interior of the board 7.

Electronic components including an optical element board 10 are arranged on the boards 7a and 7b. The arranged electronic components and operation thereof are described below in detail.

Figure 4A:
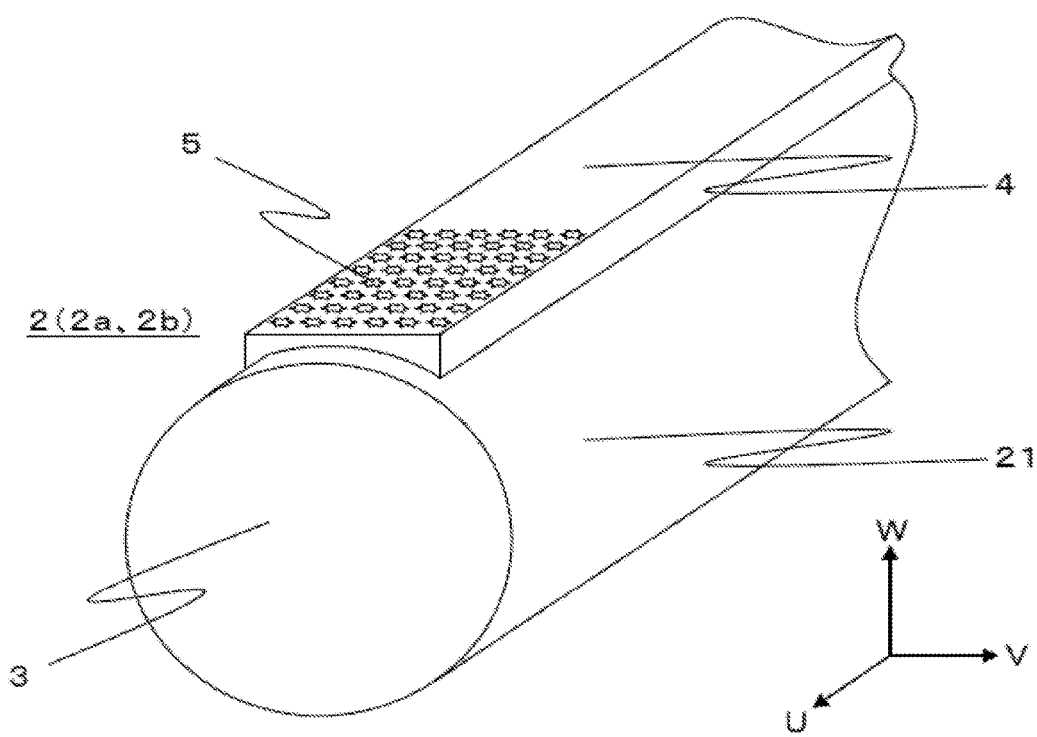
FIG. 4A is a tilted perspective view of a light guide body 2 according to Embodiment 1.
Figure 4B:
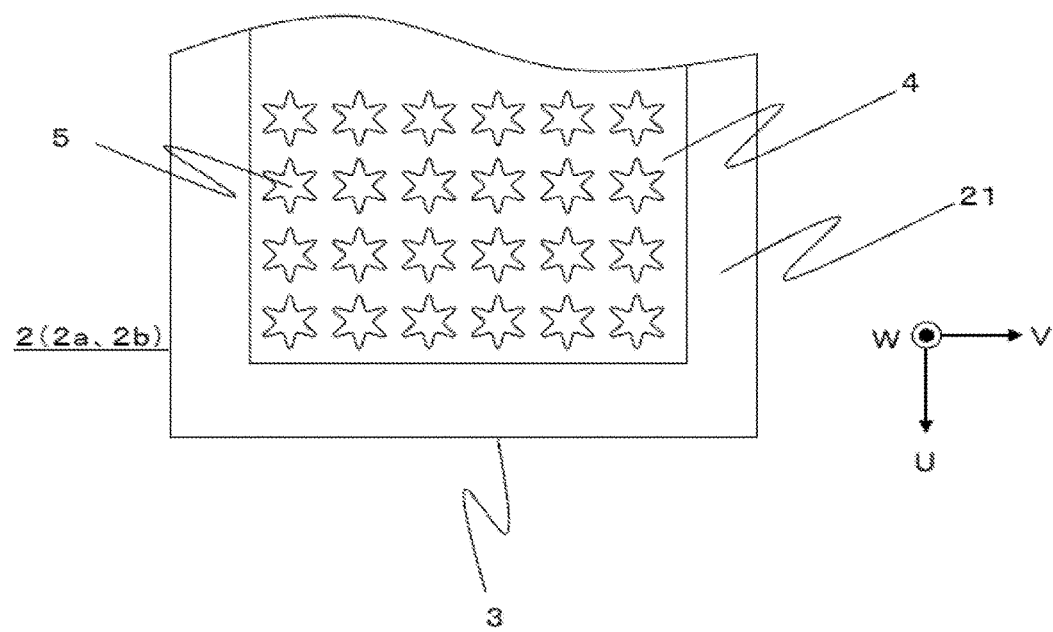
FIG. 4B is an upper surface view of the light guide body 2 according to Embodiment 1.

FIG. 4A and FIG. 4B are tilted perspective views of the light guide body 2. The light guide body 2 includes a light guide main body 21 extending in the X-axis direction in the coordinate system of FIG. 1 and FIG. 2. A band region 4 extending in the lengthwise direction is formed in a portion of the circumferential surface of the light guide main body 21. FIG. 4A is a tilted perspective view as seen when viewing the light guide body 2 from an angle such that the band region 4 is positioned directly upward. FIG. 4B is an upper surface view as seen when viewing the light guide body 2 from an angle such that the band region 4 is positioned directly upward. The surface of the band region 4 defines a coordinate system so as to be parallel to a U-V plane defined by a U axis and V axis. The W axis is defined as the axis in the direction perpendicular to the U-V plane, the U axis is defined as the axis parallel to the lengthwise direction of the light guide body 2, and the V axis is defined as the axis parallel to the transverse direction of the light guide body 2. Further, as made clear by FIGS. 3 and 4, the U axis coincides with the X axis.

Over the entire band region 4, recess or protuberance radial microstructures 5 are arranged in a two-dimensional (U-axis direction and V-axis direction) lattice pattern. That is to say, in the band region 4 formed along the lengthwise direction (U-axis direction) on a portion of the circumferential surface of the light guide main body 21, the radial microstructures 5 are arrayed two-dimensionally in the circumferential-surface direction and in the lengthwise direction of the light guide main body 21. Further, a portion of the pattern is illustrated in FIG. 4, and the remaining portion is omitted. Taking a straight line perpendicular to the band region 4 and parallel to the W axis to be a reference axis, and taking the intersection of this reference axis with the band region 4 to be a reference point, each of the radial microstructures 5 is formed by protruding parts extending radially from the reference point in at least three directions along the U-V plane parallel to the band region 4.

The light guide body 2 is made from a material that transmits light, such as plastic or glass, and is a light guide body extending in the U-axis direction. The light guide body 2 is produced by integrated molding of the light guide main body 21, the band region 4, and the radial microstructures 5 by a molding method such as injection molding.

Light emitted from the light source element 1, which is disposed in the vicinity of the end surface 3 and faces the end surface 3, enters the light guide body 2 through the end surface 3. The light that enters the light guide body 2 is reflected or refracted by the recess or protuberance radial microstructures 5 formed on the band region 4 extending in the U-axis direction and is emitted from the circumferential surface region opposite to the band region 4 of the light guide body 2. Due to propagation of light in this manner, the light guide body 2 functions as the light source device.

Although FIG. 4 illustrates a case in which there is a level difference between the circumferential surface of the light guide main body 21 and the band region 4, a configuration may be used in which there is no level difference between the circumferential surface of the light guide main body 21 and the band region 4. Further, the surface of the band region 4 is not necessarily flat, and this surface may be curved. Further, securing of uniform illumination in the main scanning direction is ensured by low-density arrangement of the radial microstructures 5 in the vicinity of the light source element 1 and more dense arrangement with increasing distance from the light source element 1. Further, the securing of uniformity in the sub-scanning direction is ensured by adjustment of sparseness in the sub-scanning direction. Although the sparseness in the sub-scanning direction varies in response to the shape of the light guide main body 21 included in the light guide body 2, in the example of the present embodiment, uniformity can be ensured by arrangement of the radial microstructures 5 in low density at both end portions and by dense arrangement at the sub-scanning direction center.

Figure 5:
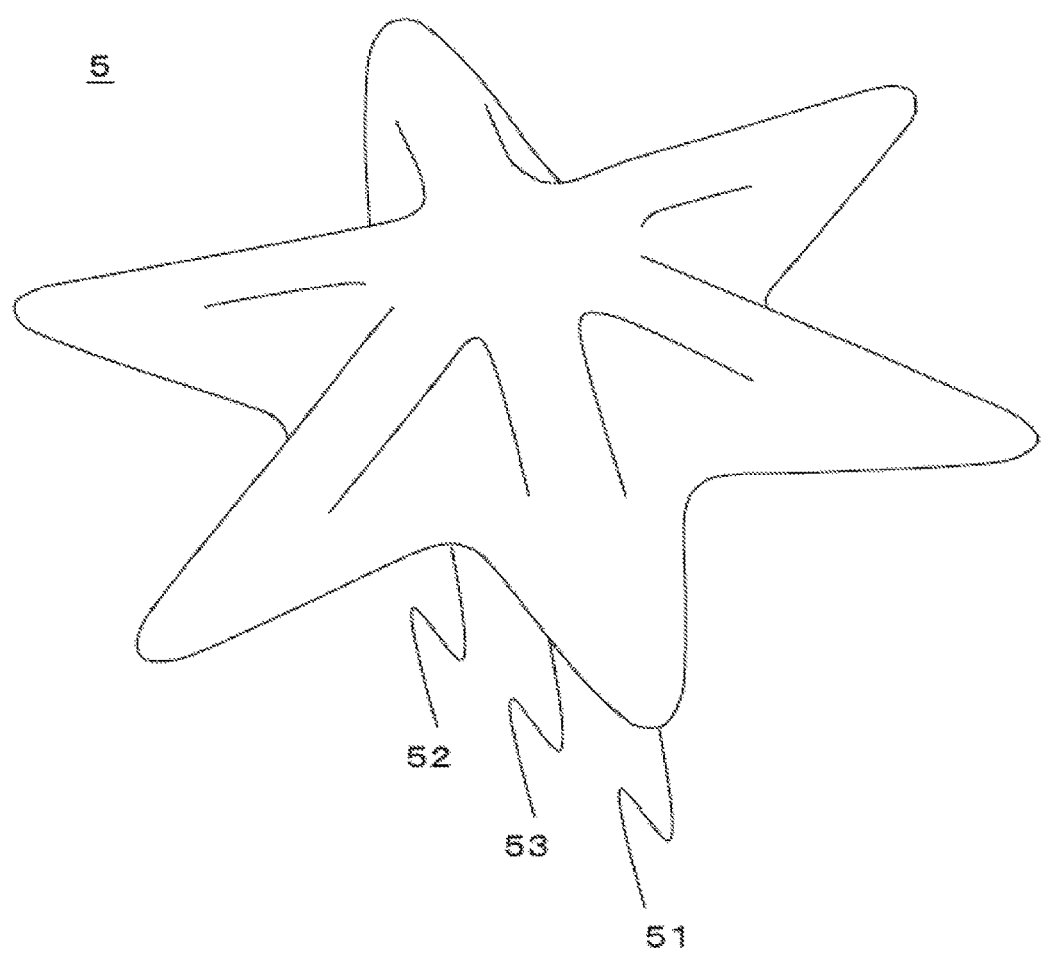
FIG. 5 is a tilted perspective view of a radial microstructure 5 according to Embodiment 1.
Figure 6:
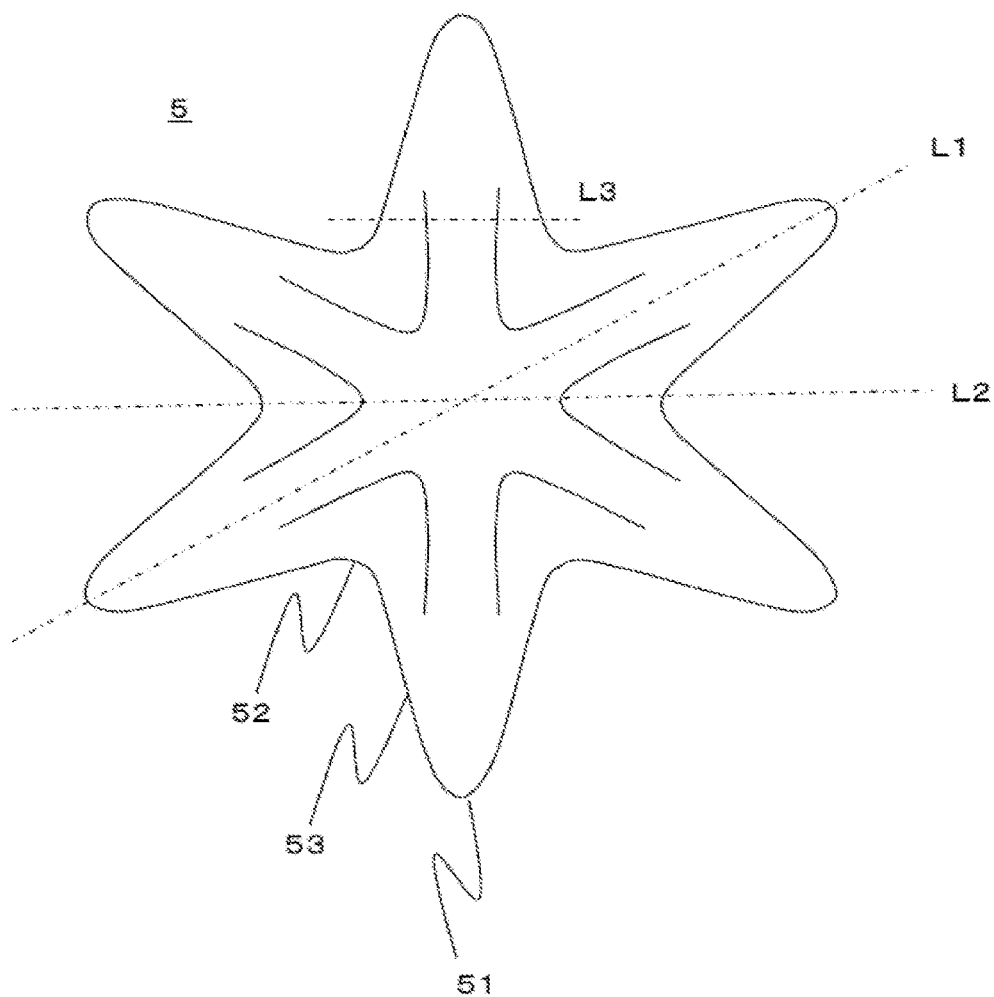
FIG. 6 is a top view of the radial microstructure 5 according to Embodiment 1.

FIG. 5 is a tilted perspective view of the recess or protuberance radial microstructure 5 formed in the band region 4 on the light guide main body 21. FIG. 6 is a top view of the radial microstructure 5 of FIG. 5 as viewed from directly above. Taking a straight line perpendicular to the band region 4 to be the reference axis, and taking the intersection of this reference axis with the band region 4 to be the reference point, the radial microstructure 5 is a six-pointed star-shaped conical-shaped structure that has six projecting parts extending radially along the entire periphery from the reference point. In the case in which the radial microstructure 5 having the six-pointed star-shaped conical-shaped structure of FIG. 5 and FIG. 6 is a protuberance, the height is about 20 μm, and in the case in which the radial microstructure 5 is a recess, depth is about 20 μm. Diameter of a virtual circle interconnecting apex portions 51 of the radially shaped protruding parts is about 120 μm, and diameter of a virtual circle interconnecting bottom portions 52 of the radially shaped protruding parts is about 60 μm.

Figure 7A:
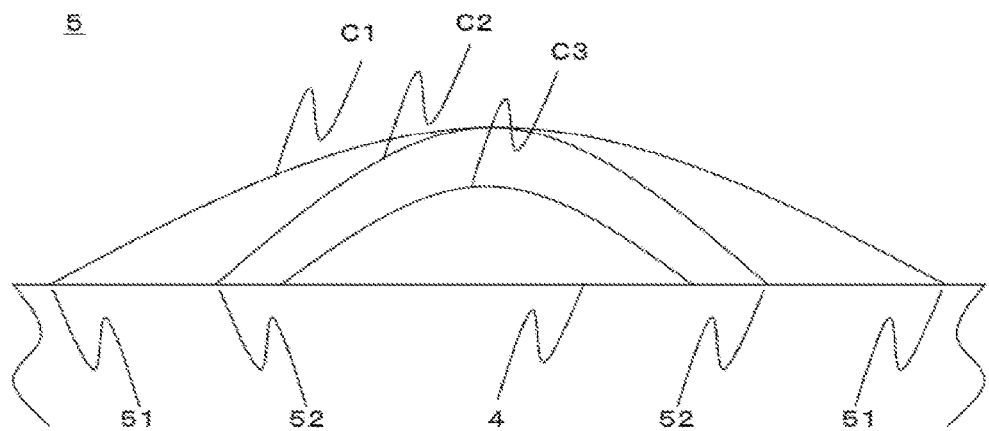
FIG. 7A is a cross-sectional drawing of the radial microstructure 5 according to Embodiment 1.
Figure 7B:
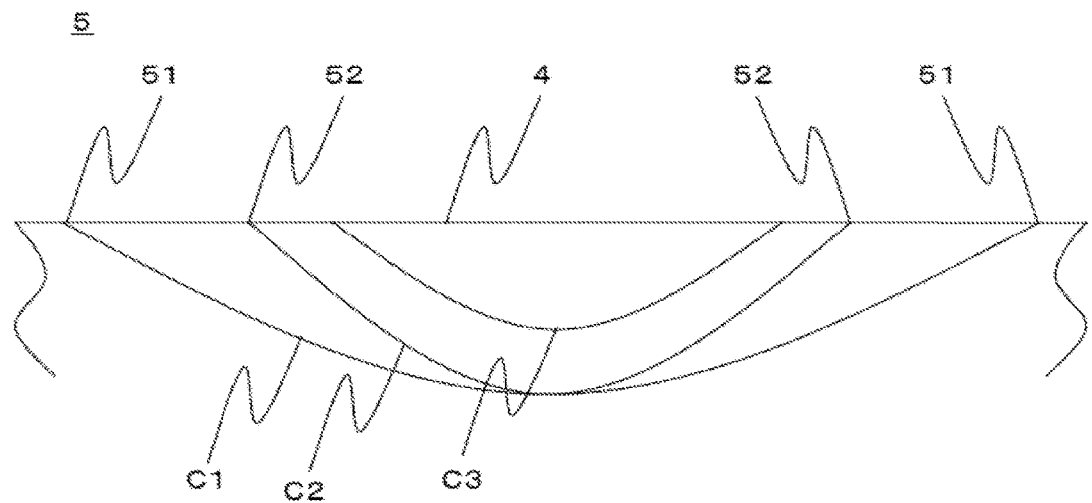
FIG. 7B is a cross-sectional drawing of the radial microstructure 5 according to Embodiment 1.

FIG. 7A is a drawing illustrating cross sections C1, C2, and C3 of the radial microstructure 5 taken along planes perpendicular to the surface of the page through the straight lines L1, L2, and L3, respectively, as illustrated in FIG. 6. As illustrated in FIG. 6, the straight line L1 passes through the mutually-opposing apex portions 51. The straight line L2 passes through the mutually-opposing bottom portions 52. The straight line L3 is a straight line perpendicular to a straight line passing through the center of the radial microstructure 5.

The cross section C1 is a cross section passing through the mutually-opposing apex portions 51, passing through the center of the radial microstructure 5 and includes the most gentle slope. As illustrated in FIG. 7A, the cross section C1 is shaped like a hill that has bulging slope faces. That is to say, the radial microstructure 5 is formed such that a cross section that passes through the center of the radial microstructure 5 and includes the most gentle slope has a hill-like shape that has bulging slope faces.

The cross section C2 is a cross section passing through the mutually-opposing bottom portions 52, passing through the center of the radial microstructure 5, and including the most steep slope. As illustrated in FIG. 7A, the cross section C2 is shaped like a hill that has bulging slope faces. That is to say, the radial microstructure 5 is formed such that a cross section passing through the center of the radial microstructure 5 and that includes the most steep slope faces has the shape of a hill that has bulging slope faces.

The cross section C3 is a cross section of the protruding part of the radial microstructure 5 and is a cross section taken along a plane perpendicular to a line passing through the center of the radial microstructure 5. As illustrated in FIG. 7A, the cross section C3 is shaped like a hill that has bulging slope faces. That is to say, the radial microstructure 5 is shaped such that a cross section of the radial microstructure 5 taken along a plane perpendicular to a straight line passing through the center of the radial microstructure 5 is shaped like a hill that as bulging slope faces.

The shape of this radial microstructure is not required to match the shape illustrated in FIG. 5 and FIG. 6. As illustrated in the tilted perspective views of FIG. 8 to FIG. 15, performance approaching that of the radial microstructure 5 of FIG. 5 and FIG. 6 can be obtained as long as there are protruding parts extending radially from the center. The number of the protruding parts extending from the center may be freely selected. However, molding from plastic or glass becomes easier as the number of protruding parts decreases, while the anticipated multi-direction scattering is more uniformly realized as the number of protruding parts increases. The radial microstructures 5a to 5h of FIGS. 8 to 15 are other examples of shapes that obtain optical properties near those of the radial microstructure 5. The shape of the radial microstructure 5 is not limited to these shapes.

Figure 8:
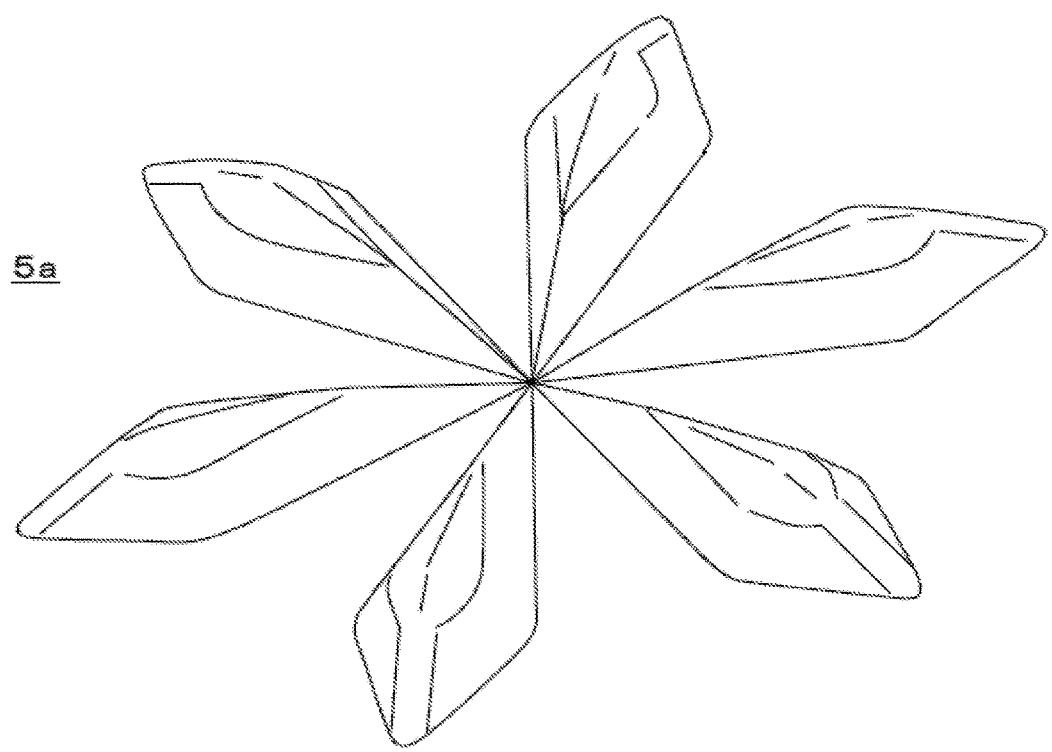
FIG. 8 is a tilted perspective view of a radial microstructure 5a according to Embodiment 1.
Figure 9:
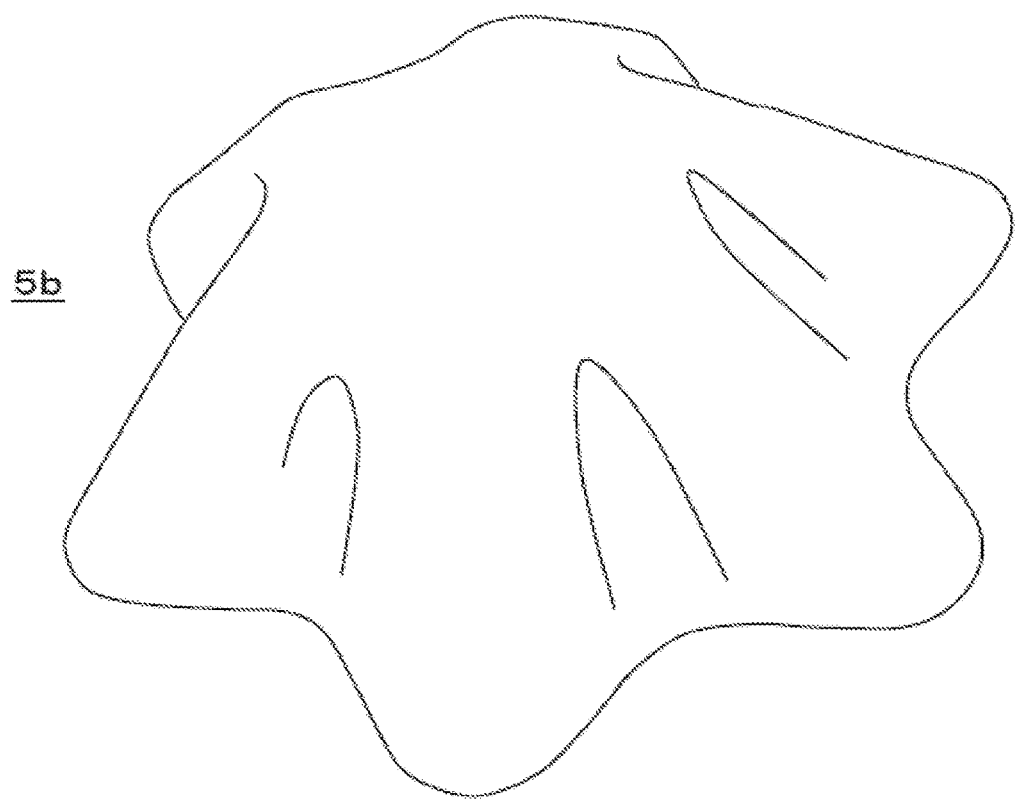
FIG. 9 is a tilted perspective view of a radial microstructure 5b according to Embodiment 1.
Figure 10:
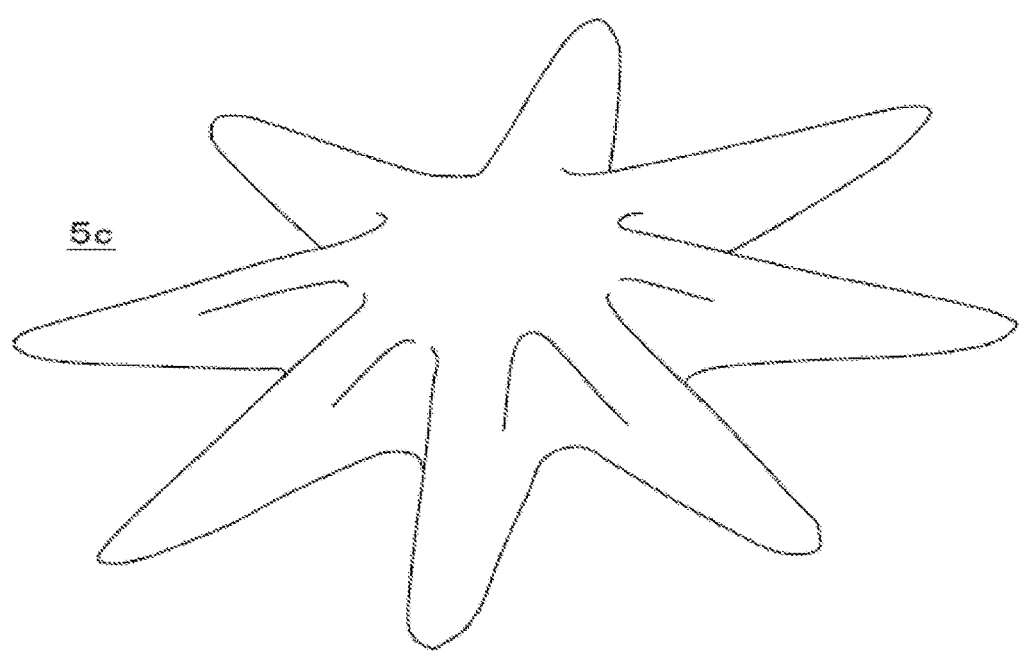
FIG. 10 is a tilted perspective view of a radial microstructure 5c according to Embodiment 1.
Figure 11:
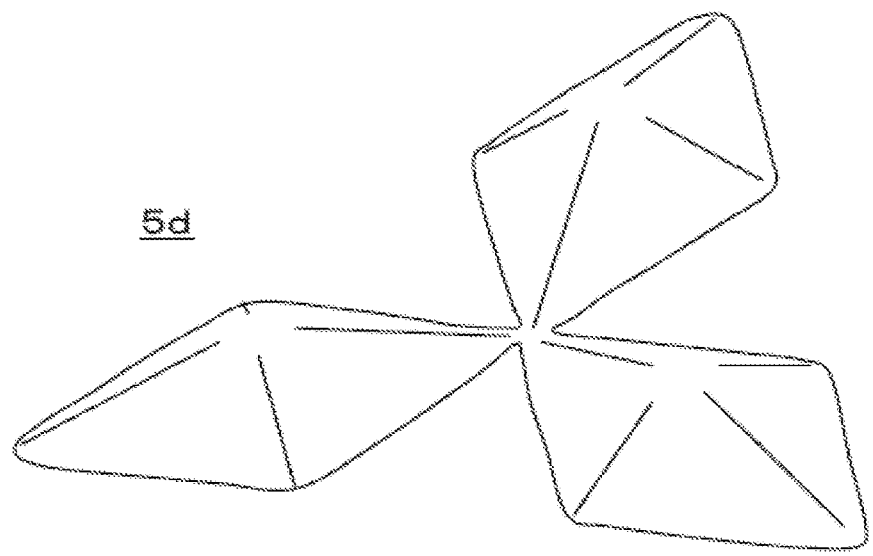
FIG. 11 is a tilted perspective view of a radial microstructure 5d according to Embodiment 1.
Figure 12:
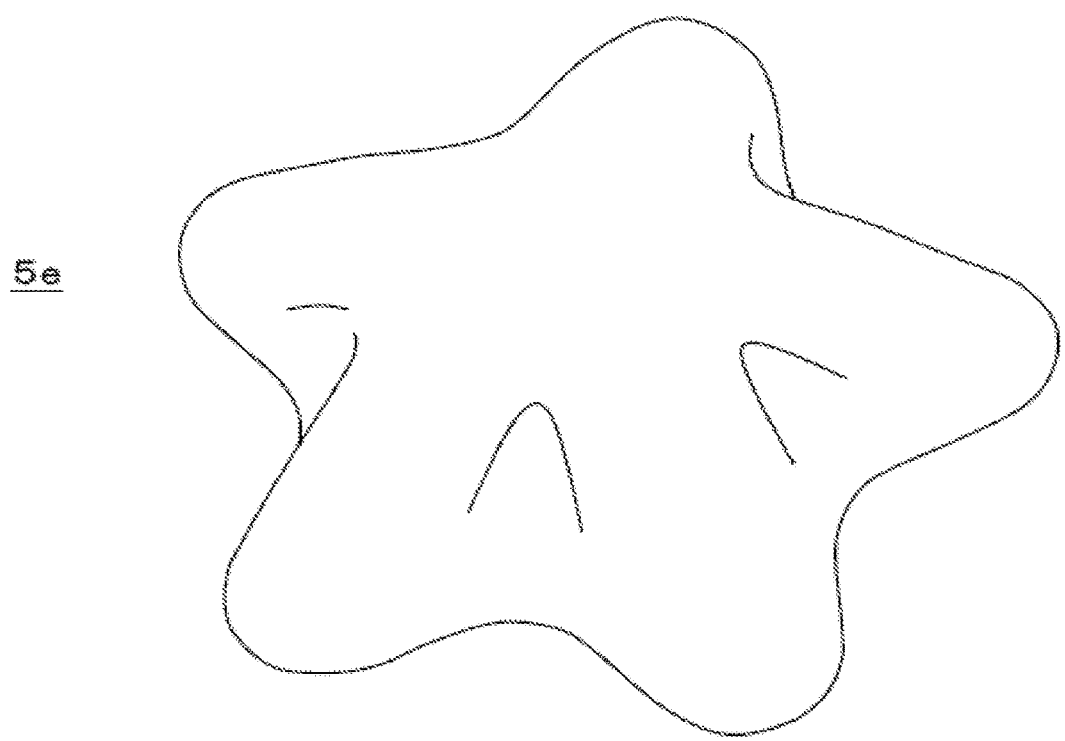
FIG. 12 is a tilted perspective view of a radial microstructure 5e according to Embodiment 1.
Figure 13:
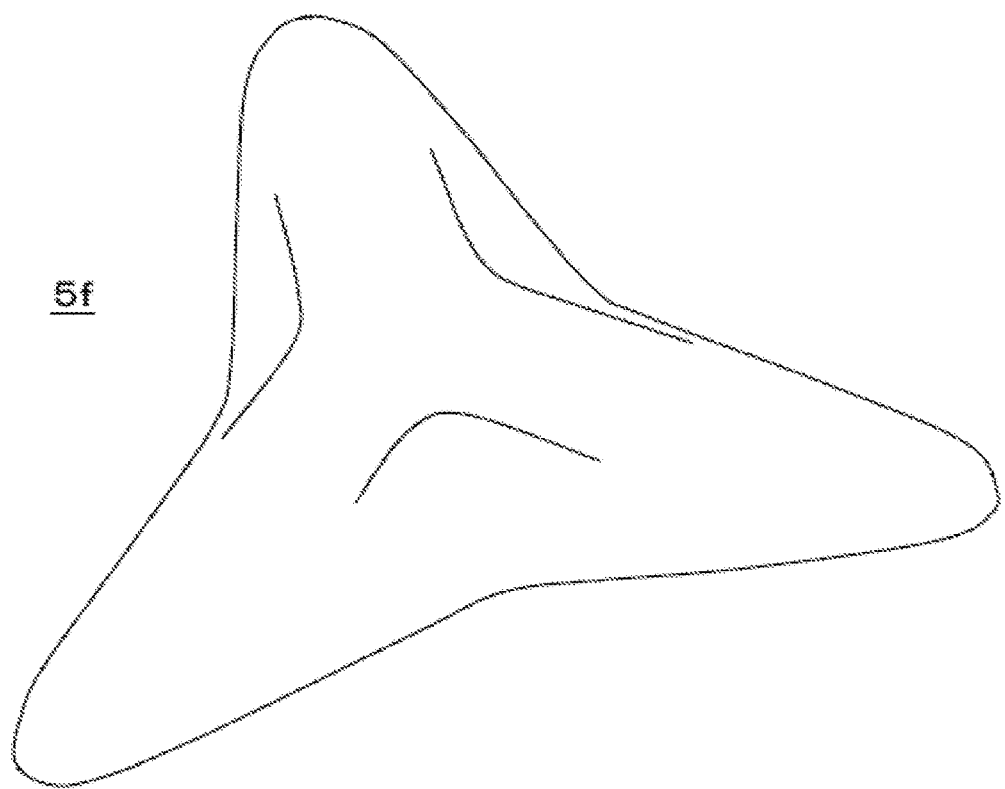
FIG. 13 is a tilted perspective view of a radial microstructure 5f according to Embodiment 1.
Figure 14:
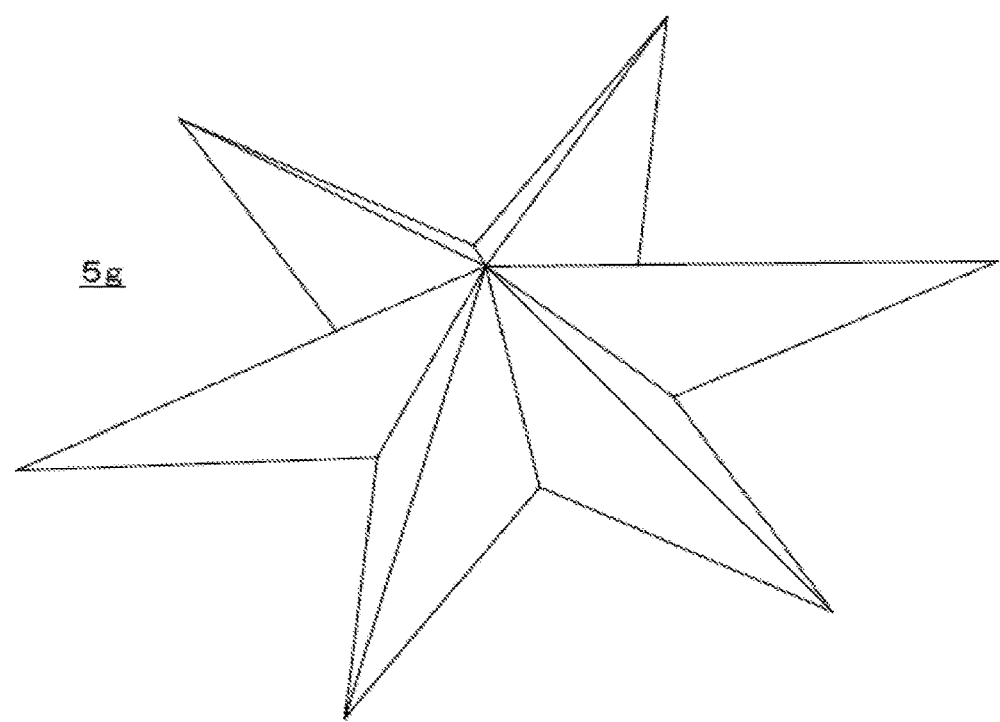
FIG. 14 is a tilted perspective view of a radial microstructure 5g according to Embodiment 1.
Figure 15:
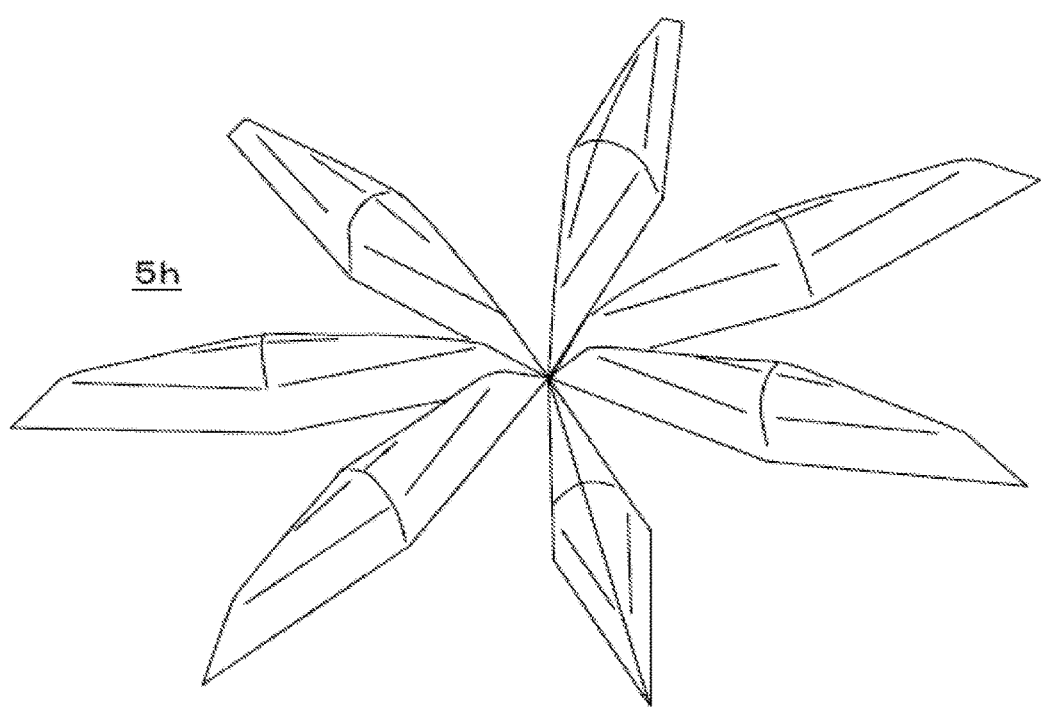
FIG. 15 is a tilted perspective view of a radial microstructure 5h according to Embodiment 1.

In Embodiment 1, FIG. 8 illustrates the radial microstructure 5a that has a six-leaf-like shape. FIG. 9 illustrates the radial microstructure 5b that has a six-pointed star parachute-like conical shape. FIG. 10 illustrates the radial microstructure 5c that has an eight-pointed star conical shape. FIG. 11 illustrates the radial microstructure 5d that has a three-leaf-like shape. FIG. 12 illustrates the radial microstructure 5e that has a parachute-like starfish shape. FIG. 13 illustrates the radial microstructure 5f that has a three-pointed star conical shape. FIG. 14 illustrates the radial microstructure 5g that has a six-(mountain-shaped point) star shape. FIG. 15 illustrates the radial microstructure 5h that has a seven-leaf-like shape.

Further, the shape of the radial microstructure is not required to necessarily match the shape of FIG. 7A. The cross section that passes through the center of the radial microstructure and that includes the gentlest sloping face may be shaped like a hill that has concave slope faces, like a hill that has linear slope faces, or may have a shape that includes multiple hills. Further, the shape of the radial microstructure is not limited to shapes that project from the surface of the band region 4 as in FIG. 7A, and the radial microstructure may have a shape that is recessed from the surface of the band region 4 indicated in FIG. 7B.

Figure 16:
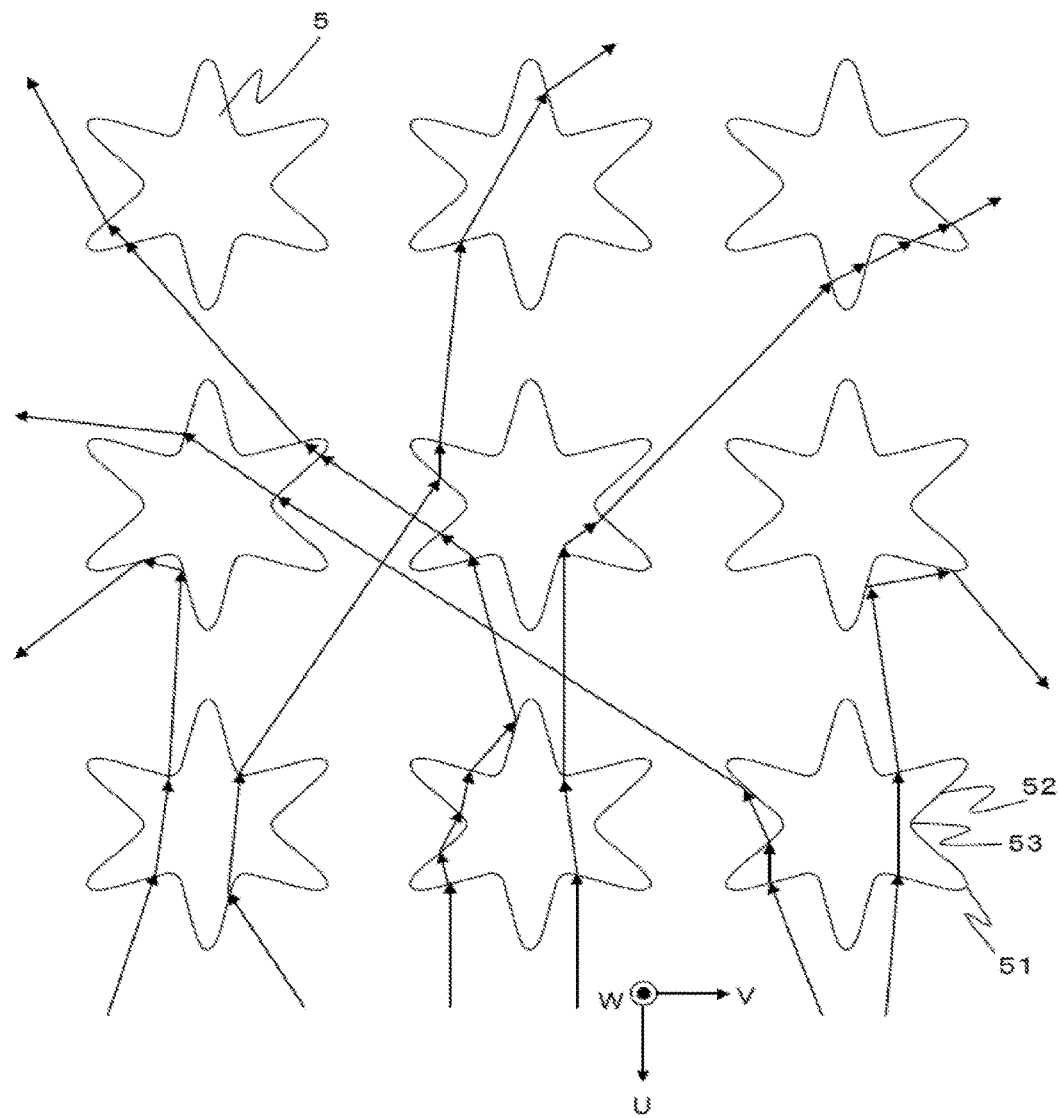
FIG. 16 is a scattered light ray diagram for the radial microstructure 5 according to Embodiment 1.
Figure 17:
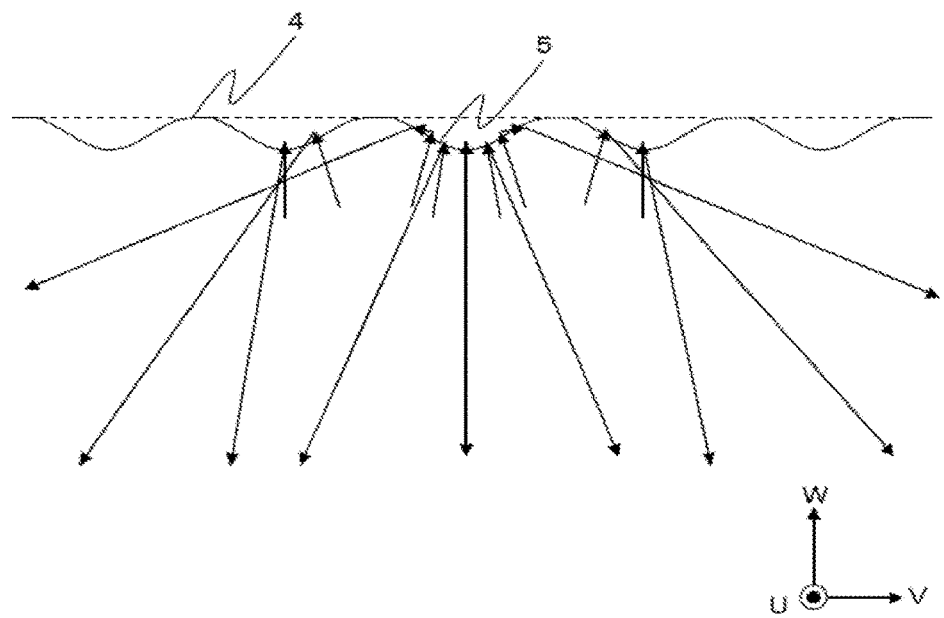
FIG. 17 is a scattered light ray diagram for the radial microstructure 5 according to Embodiment 1.
Figure 18:
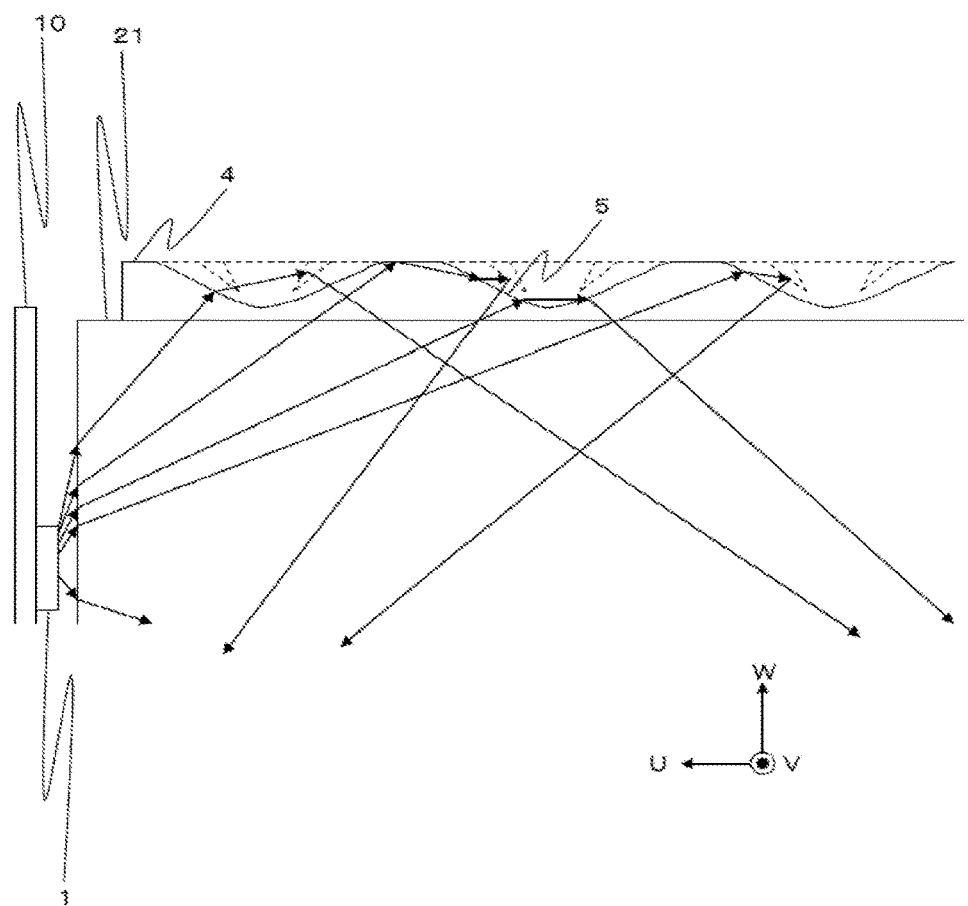
FIG. 18 is a scattered light ray diagram for the radial microstructure 5 according to Embodiment 1.

FIGS. 16 to 18 schematically illustrate scattering of light by the radial microstructure 5 of FIG. 4. FIG. 16 illustrates scattering of light when viewing the U-V plane from the W-axis direction. FIG. 17 illustrates scattering of light when viewing the V-W plane, defined by the V axis and W axis, from the U-axis direction. FIG. 18 illustrates scattering of light when viewing the W-U plane, defined by the W axis and U axis, from the V-axis direction. The light emitted from the light source element 1 and entering the light guide body 2 from the end surface 3, due to the protuberances and recesses of the surface of the radial microstructures 5 formed on the band region 4, is scattered by repeated multiple refraction and reflection, including total reflection, within the U-V plane, within the V-W plane, and within the W-U plane. The light rays illustrated in FIGS. 16 to 18 are examples and illustrate only some of the paths of scattered light. The light entering the light guide body 2 passes through various types of light paths, is scattered in many directions, and is irradiated from the circumferential surface region opposing the band region 4 of the light guide main body 21 included in the light guide body 2.

FIG. 16 to FIG. 18 illustrate scattering of light in the case of the six-pointed star-shaped conical-shaped structure radial microstructure 5 illustrated in FIG. 5 and FIG. 6. FIG. 16 is a scattered light ray diagram illustrating the scattering of light within the U-V plane direction as viewed while looking at the U-V plane from the W-axis direction. For the radial microstructure 5 in the U-V plane, the apex portion 51 of the radially-shaped protruding part has a projecting curved line, the bottom portion 52 of the radially-shaped protruding part has a concave curved line, and the side section 53 between the apex portion and the bottom portion of the radially-shaped protruding part has a straight line. Thus the apex portion 51, the bottom portion 52, and the side section 53 of the radially-shaped protruding part each have different reflection angles of light, and the light entering the light guide body 2 undergoes repeated complex scattering by refraction and reflection, including total reflection, within the U-V plane.

FIG. 17 is a scattered light ray diagram illustrating scattering of light in the V-W plane direction as viewed while looking at the V-W plane from the U-axis direction. The radial microstructure 5 has a concave curved line in the V-W plane. Thus the reflection angles of the light at each of the recessed sections are different, and the light that enters the light guide body 2 undergoes repeated complex scattering by refraction and reflection, including total reflection, within the V-W plane. Further, scattering is similar in the case in which the radial microstructure 5 has a protuberant curved line in the V-W plane.

FIG. 18 is a scattered light ray diagram illustrating the scattering of light in the W-U plane direction as viewed while looking at the W-U plane from the V-axis direction. The radial microstructure 5 has a concave curved line in the W-U plane. Thus the angles of progress of light by reflection and refraction are different in each recessed section, and the light that enters the light guide body 2 undergoes repeated complex scattering by refraction and reflection, including total reflection, within the W-U plane. Further, scattering is similar in the case in which the radial microstructure 5 has a protuberant curved line in the W-U plane.

Although the scattering of light is described above in the case of the six-pointed star-shaped conical structure radial microstructure 5, a similar operational effect is obtained for the radial microstructures 5a to 5h illustrated in FIGS. 8 to 15. As illustrated in FIGS. 8 to 15, the shape preferably has a point of symmetry at the intersection of the reference axis and the band region 4, or has linear symmetry relative to a straight line parallel to the V axis.

Further, in Embodiment 1, a case is indicated in FIG. 17 in which the radial microstructure 5 is formed as a recess with respect to the circumferential surface portion of the light guide main body 21. However, similar performance can be obtained by forming as a protuberance with respect to the circumferential surface portion of the light guide main body 21. That is to say, the radial microstructure 5 may be formed as a recess in the band region 4, or as a protuberance, or may be formed by intermixing of concavities and protuberances. Further, radial microstructures having different shapes and numbers of protruding parts, as illustrated in FIGS. 8 to 15, may be intermixed and formed.

Due to scattering of light in multiple directions in the aforementioned manner, light illuminating the reading target object MM is made uniform. FIG. 19 is a tilted perspective view of a light guide body 2 of a comparative example. As illustrated in FIG. 19, in a microstructure 105 formed linearly in the V-axis direction, which is the width direction, of the band region 4, a bias occurs in the illumination angle toward the U-axis direction, which is the lengthwise direction. Thus shadows occur during reading of an original copy that has protuberances and recesses. The image reading device 11 according to Embodiment 1 can solve this problem by scattering with uniformity in the angle of incidence. Further, wide scattering in the V-axis direction of light emitted from the microstructure 105 of FIG. 19 is difficult, highly accurate assembly is required during assembly with the image reading device, and the assembly process is time consuming. In the image reading device 11 according to Embodiment 1, the radial microstructure 5 can cause good scattering of light in the V-axis direction as illustrated in FIG. 16 and FIG. 17, and thus can solve this problem.

Further, FIG. 20 is a tilted perspective view of the light guide body 2 of another comparative example. As illustrated in FIG. 20, even in the case of a simple lattice pattern of hemispheres, or in the different case of two-dimensional arrangement on the surface of the band region 4 parallel to the U-V plane, more scattering of light in the V-axis direction is possible than for the microstructure 105 illustrated in FIG. 19. However, the emitted light rays are concentrated in a specific direction by a simple shape such as the hemispherical shape, there is insufficient scattering of light in the U-axis direction (main scanning direction), and the U-axis-direction illumination angle bias is not solved. Thus unnatural shadows occur when an original copy is read that has protuberances and recesses. In the case in which the concavities or protuberances are prism-shaped as illustrated in FIGS. 5 to 15 and are arranged two-dimensionally on the band region 4, uniform illumination of the original copy is achieved.

FIG. 21 is a tilted perspective view of the light guide body 2 of yet another comparative example. In this comparative example, light scattering members 205 are formed on the band region 4 by application of a film or coating that reflects light. When the light scattering member 205 is formed as illustrated in FIG. 21, the useable wavelength depends on the reflection characteristics of the coating or film. However, the reflection characteristics of the light guide body 2 in this embodiment are determined by refractive index of the light guide main body 21, and change of refractive index is minor for the wavelengths that pass through the material. Thus there is almost no dependence on the wavelength of light, and various wavelengths may be used simultaneously as long as the wavelengths pass through the light guide main body 21. However, in the case of use of an extremely short wavelength such as that of UV light, a material must be selected for the light guide body 21 that does not deteriorate due to the UV light.

Preferred examples of the light source element 1 arranged in the vicinity of the end surface 3 of the aforementioned light guide body 2 are point light source elements such as, without particular limitation, light emitting diodes (LEDs) and organic electroluminescence (organic EL) elements.

FIG. 22 is a chart on which is plotted illumination angle intensity distribution in the U-axis direction (lengthwise direction) for a simulation of illumination light from the light guide body 2 illustrated in FIG. 4A in which the radial microstructures 5 are formed on the band region 4. Further, FIG. 22 shows the illumination light from the light guide body 2 of the comparative examples illustrated in FIG. 19 and FIG. 21, in which linear microstructures extend in the V-axis direction (width direction) in the band region 4. That is to say, FIG. 22 is a chart that illustrates the relationship between illumination intensity and illumination light radiation angle for the light guide body 2 projecting light in the W-U plane, in which the W-axis direction is taken to be 0°, and the U-axis direction is taken to be ±90°. In FIG. 22, the solid-line plot indicates results of a simulation of the radial microstructure 5 according to Embodiment 1. The dashed-line plot indicates results of simulation of the linear microstructure of the comparative examples illustrated in FIG. 19 and FIG. 21. For reference, results of a simulation using a white-coating scattering structure are indicated by the dotted line plot.

FIG. 23 is used below for detailed description of the results of the simulations indicated in FIG. 22. FIG. 23 is a drawing illustrating illumination intensity versus radiation angle of illumination light from the simulated light guide body 2. In FIG. 23, corresponding to the axes of FIG. 22, the W-axis direction is taken to be 0°, and the U-axis direction is taken to be +90°. In FIG. 23, length of the arrow indicating the illumination light corresponds to the illumination intensity of the illumination light.

Figure 23A:
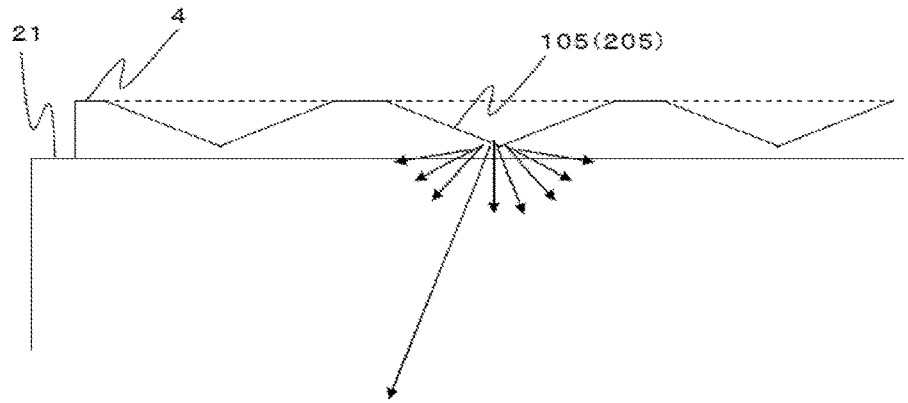
FIG. 23A is a drawing illustrating the illumination intensity versus radiation angle for the illumination light from a light guide body 2 according to a comparative example.

FIG. 23A illustrates the illumination intensity versus the illumination light radiation angle for the linear microstructure of the comparative example indicated by the dashed-line plot of FIG. 22. As illustrated in FIG. 23A, length of the arrow, which indicates illumination light intensity, projects outwardly in the vicinity of a radiation angle of 20°, and the values of the lengths of the arrows indicating the illumination light intensity at other radiation angles are nearly zero. That is to say, the light reflected by the linear microstructure of the comparative example is concentrated and irradiated in a particular direction.

Figure 23B:
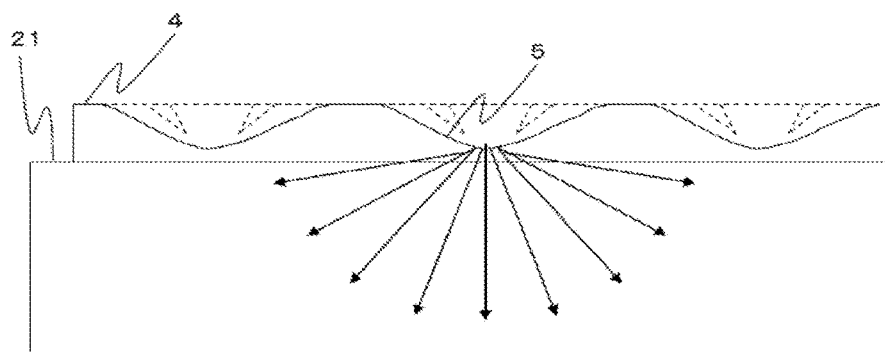
FIG. 23B is a drawing illustrating the illumination intensity versus radiation angle for the illumination light from the light guide body 2 according to Embodiment 1.

FIG. 23B illustrates the illumination intensity versus the radiation angle of the illumination light for the radial microstructure 5 according to Embodiment 1 indicated by the solid-line plot of FIG. 22. As illustrated in FIG. 23B, the illumination light intensity from the radiation angle −90° to +90° is less than the illumination intensity of the peak intensity of the illumination light when using the linear microstructure of the comparative example. However, the change of the illumination light intensity from the radiation angle −90° to +90° is small. That is to say, the light reflected by the radial microstructure 5 scatters and illuminates uniformly in various directions without bias in a particular direction.

Large bias occurs in the illumination intensity versus radiation angle when using the linear microstructure of the comparative example. On the other hand, for the radial microstructure 5 according to Embodiment 1, the change of illumination intensity versus illumination angle decreases in a manner similar to the white-coating scattering structure, and enables uniformity of the illumination intensity versus the illumination angle in the lengthwise direction. Thus even when the original copy has protuberances and recesses, light irradiates the protuberances and recesses from all directions, and thus the protuberances and recesses can be uniformly illuminated. Thus an image can be read that is free of shadows. Further, due to the wavelength dependence being small, uniform illumination characteristics can be obtained even when using a light source that has a freely-selected wavelength. Further, FIGS. 22 and 23 are described above for the case in which the W-axis direction is taken to be 0° and the U-axis direction is taken to be ±90°. Similarly, for the case in which the W-axis direction is taken to be 0° and the V-axis direction is taken to be ±90° for the radial microstructure 5 according to Embodiment 1, the change of illumination intensity versus the illumination light radiation angle is small, and the light reflected by the radial microstructure 5 uniformly scatters and illuminates in various directions without bias in a particular direction. Thus the radial microstructure 5 according to Embodiment 1 can make the illumination intensity versus illumination angle uniform even in the transverse direction.

Next, operation of the image reading device 11 according to Embodiment 1 is described. The image reading device 11 described here has an internal light source element 1, and light emitted from the light source element 1 is guided within the light guide body 2 and illuminates the reading target object MM.

Figure 24A:
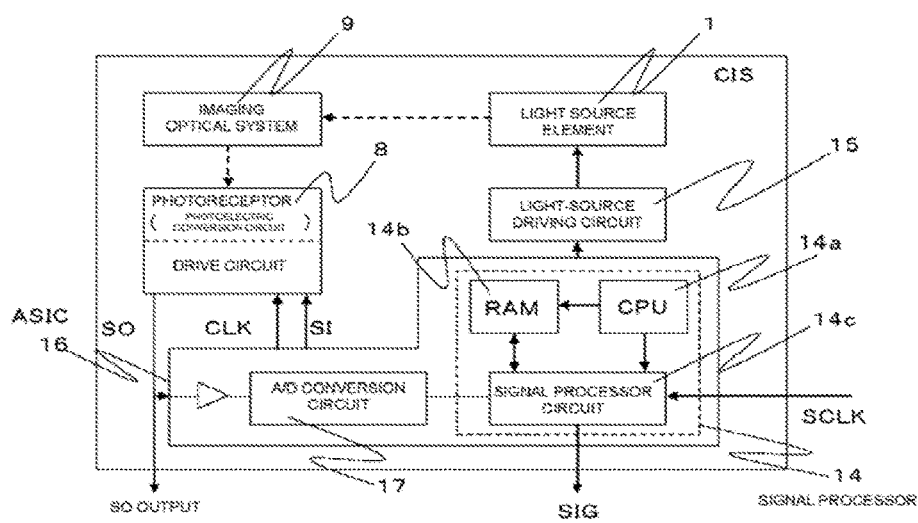
FIG. 24A is a function block diagram of the image reading device according to Embodiment 1.
Figure 24B:
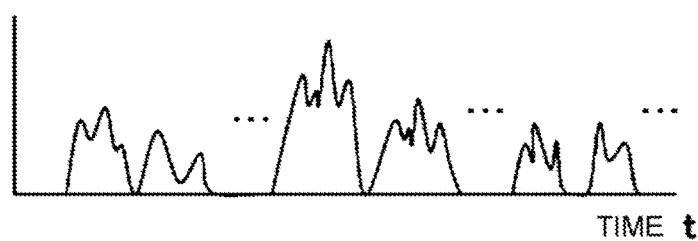
FIG. 24B is a graph of an analog output of the image reading device according to Embodiment 1.

FIG. 24 is a function block diagram and a graph showing an analog output of the image reading device 11 according to Embodiment 1. FIG. 24A is the function block diagram of the image reading device 11 according to Embodiment 1. Each of the elements indicated in the function block diagram is arranged on the boards 7a and 7b.

The image reading device 11 is a CIS and includes the light source element 1, the sensor IC 8, the imaging optical system 9, a signal-processing IC 14, a light-source driving circuit 15, an application-specific integrated circuit (ASIC) 16, and an external connector (not illustrated). The signal-processing IC 14, together with a central processing unit (CPU) 14a and a random access memory (RAM) 14b, performs signal processing of the photoelectric conversion output of the light received by the sensor IC 8. The CPU 14a, the RAM 14b, and the signal processing circuit 14c included in the signal-processing IC 14 are collectively termed the "signal processor 14". The external connector functions as a signal interface for input-output, including output of the photoelectric-converted output of the sensor IC 8 and output of the processed signal thereof.

Operation of the image reading device 11 according to Embodiment 1 is described below. Initially, the CPU 14a included in the signal-processing IC 14 transmits a light source turn-on signal to the light-source driving circuit 15. The light-source driving circuit 15 supplies, on the basis of the received light source turn-on signal, a respective pre-scribed-time-period power supply to each of the multiple light source elements 1. The illumination light generated by the light source element 1 enters the light guide body 2 from the end surface 3, repeatedly passes through or reflects from the radial microstructures 5, and illuminates the reading target object MM. Even in the case in which the light source element 1 is external to the image reading device 11, the light source element 1 may be driven and controlled by the image reading device 11.

The light reflected or transmitted by the reading target object MM is focused by the imaging optical system 9 onto the sensor IC 8. The sensor IC 8 is a photoreceptor element that functions as a photoreceptor that includes a semiconductor chip and the like that receives the focused light, photoelectrically converts the received light, and outputs a converted electrical signal. The sensor IC 8 carries other components, such as a drive circuit. The ASIC 16 generates a clock signal (CLK) synchronously with a system clock (SCLK) from a timing generator and generates a start signal (SI) synchronously with the clock signal CLK. The photoreceptor obtains a photoelectrically-converted analog output (SO) at the timing of the start signal SI. One example of the analog output SO is illustrated by the graph in FIG. 24B. In this graph, the vertical axis indicates the output value, and the horizontal axis indicates time (t).

Figure 24C:
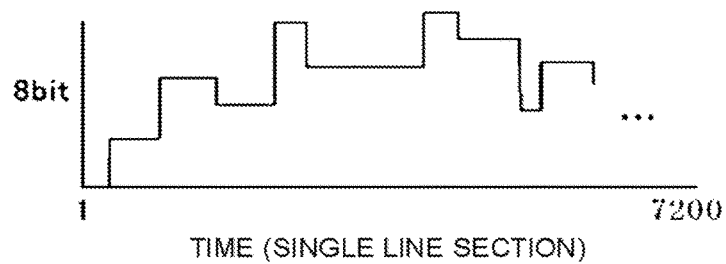
FIG. 24C is a graph of a digital output of the image reading device according to Embodiment 1.

For FIG. 24A, as described above, the CPU 14a, the RAM 14b and the signal processing circuit 14c included in the signal-processing IC 14 are collectively termed the "signal processor 14". The analog output SO undergoes analog-digital (A/D) conversion by an A/D conversion circuit 17, and the signal processing circuit 14c performs processing such as all-bit correction and shading correction including sample and hold. The correction of the signal data is performed by acquiring data from the RAM region storing standard data and the RAM region storing the signal data, and then performing calculation processing. Thereafter, the signal processor 14 outputs image data of the reading target object MM as the digital output (SIG). This image data may be sent to a device external to the image reading device 11, or may be sent to an external device after performance of further image processing within the image reading device 11. FIG. 24C is a graph illustrating one example of the digital output SIG. In this graph, the vertical axis indicates the 8-bit output value, and the horizontal axis indicates time in a single line section. Due to the image reading device 11 being a line sensor, the horizontal axis is plotted in single line section time units. That is to say, the image reading device 11 reads the reading target object MM of a single line in the main scanning direction, and conveys the reading target object MM in the sub-scanning direction to read the next line.

In this manner, the image reading device 11 according to Embodiment 1 includes the light guide bodies 2a and 2b, the boards 7a and 7b, the line sensor units 8a and 8b, and the lens array units 9a and 9b. Light enters from the end surface 3, and the light guide body 2 reflects and refracts the light by the radial microstructures 5 on the band region 4, emits the light from the portion opposing the band region 4 of the light guide main body 21, allows transmission through the cover member 6 made of transparent plastic or glass, and illuminates the reading target object MM. On the surfaces in one direction of the boards 7a and 7b are arranged the line sensor units 8a and 8b, formed by a plurality of photoreceptor elements arranged along the main scanning direction, and lens array units 9a and 9b, having a plurality of lenses arranged along the main scanning direction to focus the reflected and transmitted light on the line sensor units 8a and 8b.

In the band region 4 of the light guide body 2 of the image reading device 11 according to Embodiment 1, radial microstructures 5 are formed that include at least three radially-shaped projections. Due to adoption of this type of shape, the light entering the radial microstructure 5 is repeatedly reflected and transmitted through a complex light optical path, and then is emitted from the light guide body 2. Thus the emitted light is uniform, and when the original copy has folds, the generation of shadows can be suppressed. Further, the radial microstructure 5 is different from the microstructure described in Patent Literature 1 in that light can also be scattered in the transverse direction of the band region 4. Thus the light guide body 2 is easily assembled with the image reading device 11, and this enables the securing of likelihood of assembly.

Further, in order to obtain uniform emission of light, the light scattering member described in Patent Literature 2 requires steps to form the light scattering member that are separate from the molding of the light guide body. However, the image reading device 11 according to Embodiment 1 can eliminate these steps. Further, the radial microstructures 5 are disposed in a lattice pattern, and thus are easily manufactured. Further, there is no selection of the utilized wavelength in the manner of the light scattering member described in Patent Literature 2, and thus use is possible for light of a broad range of wavelengths, and a light source that has a freely-selected wavelength can be used.

Further, although the light guide body described in Patent Literatures 3 and 4 is capable of making the illumination light of in the sub-scanning direction uniform at various positions in the main scanning direction, this light guide body is incapable of uniformity of the illumination light in the main scanning direction. However, the image reading device according to Embodiment 1, rather than just making illumination light uniform in the transverse direction, which is the sub-scanning direction, is also able to make illumination light uniform in the lengthwise direction (main scanning direction). This uniformity enables uniform illumination of even an original copy that has protuberances and recesses, and enables reading of images without the occurrence of unnatural shadows.

Embodiment 2

Figure 25A:
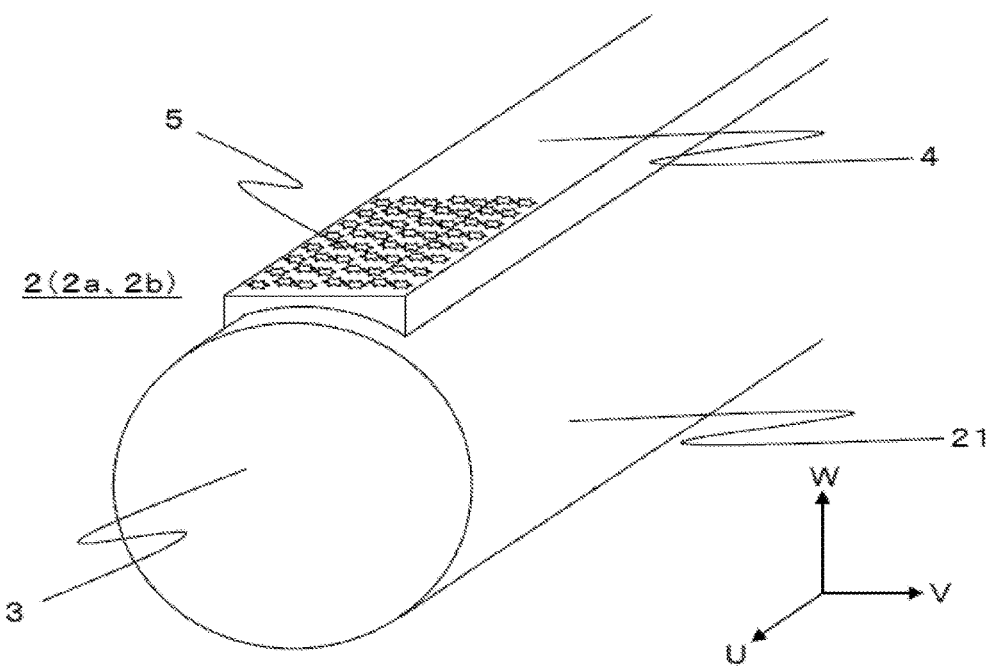
FIG. 25A is a tilted perspective view of a light guide body 2 according to Embodiment 2.
Figure 25B:
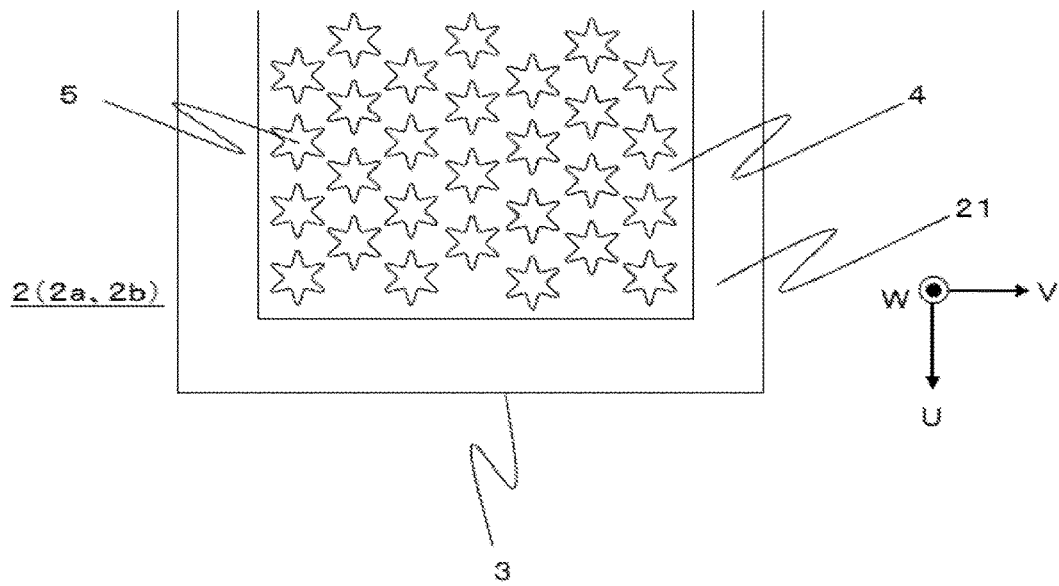
FIG. 25B is an upper surface view of the light guide body 2 according to Embodiment 2.
Figure 26A:
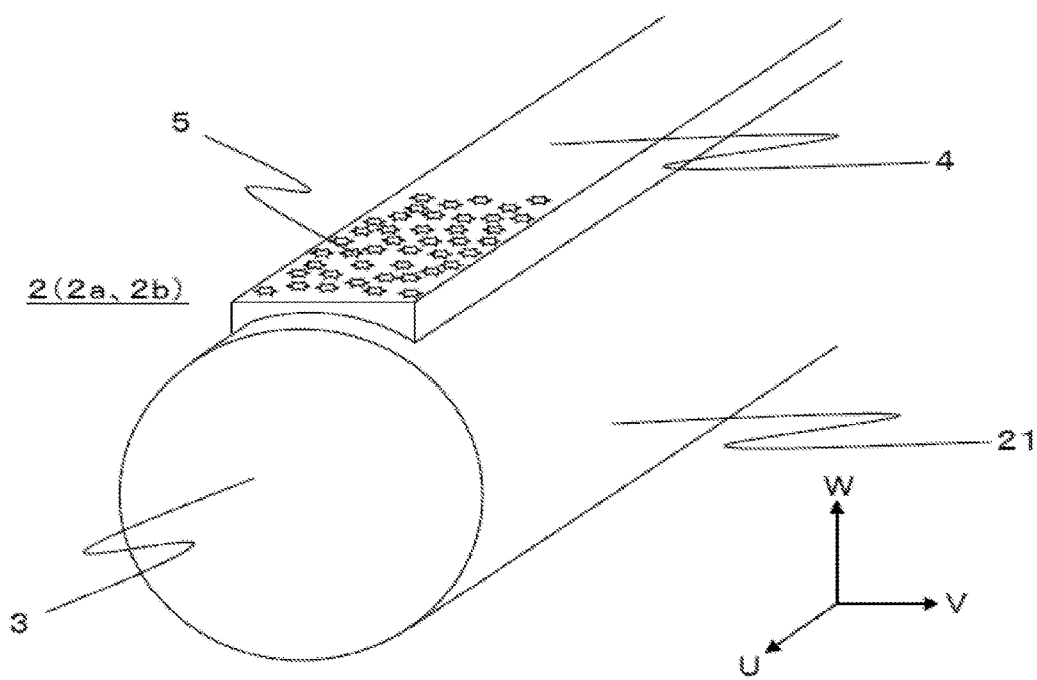
FIG. 26A is a tilted perspective view of another light guide body 2 according to Embodiment 2.

The image reading device 11 according to Embodiment 2 is described using FIG. 25 and FIG. 26. FIG. 25 is a tilted perspective view and an upper surface view of the light guide body 2 according to Embodiment 2, and FIG. 26 is a tilted perspective view and an upper surface view of another light guide body 2 according to Embodiment 2. Although the radial microstructures 5 are arranged in a lattice pattern for ease of manufacture in Embodiment 1, such arrangement is not limiting. In the image reading device 11 according to Embodiment 2, the radial microstructures 5 are arranged in a zigzag lattice pattern extending in the U-axis direction and mutually adjacent in the V-axis direction as illustrated in FIG. 25. In a separate example, the arrangement is random as illustrated in FIG. 26. In the same manner as Embodiment 1, the density of the radial microstructures 5 may be low in the vicinity of the light source element 1, and the density may increase with distance from the light source 1, to ensure the securing of uniform illumination.

In the image reading device 11 according to Embodiment 2, the radial microstructures 5 are arranged in a zigzag or random pattern. Thus scattering is further realized in multiple directions, and further uniformity of emitted light can be obtained. Further, the probability of incidence of light on the radial microstructure 5 from the light source element 1 increases, and this has the effect of increasing the intensity of light emitted from the light guide body 2.

Embodiment 3

Figure 28:
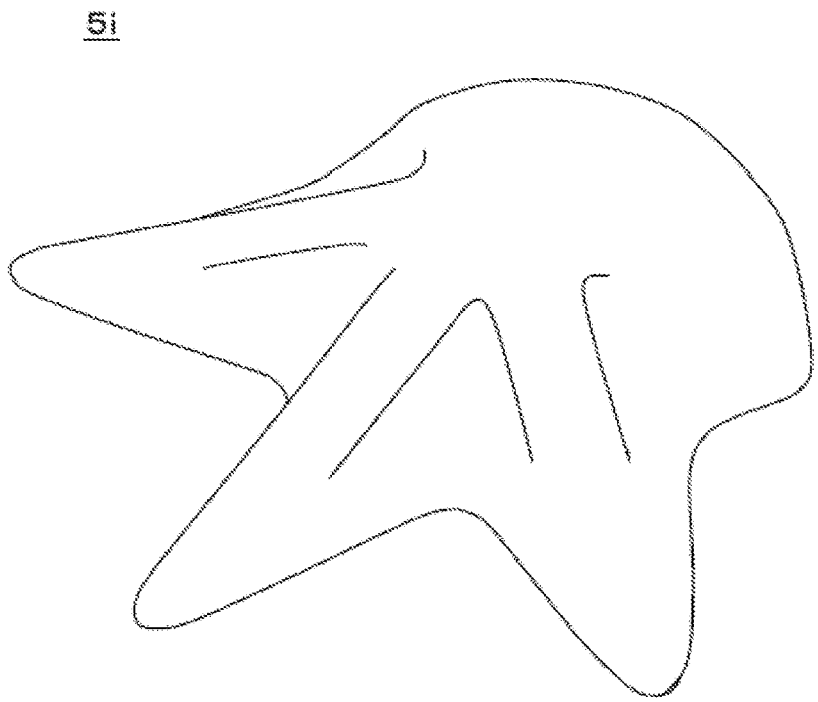
FIG. 28 is a tilted perspective view of a microstructure 5i according to Embodiment 3.
Figure 29:
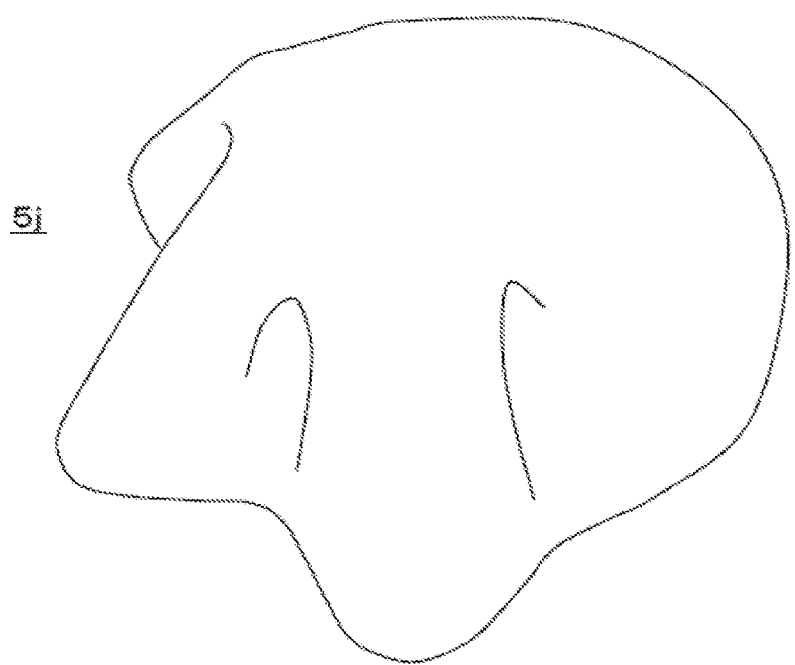
FIG. 29 is a tilted perspective view of a microstructure 5j according to Embodiment 3.
Figure 30A:
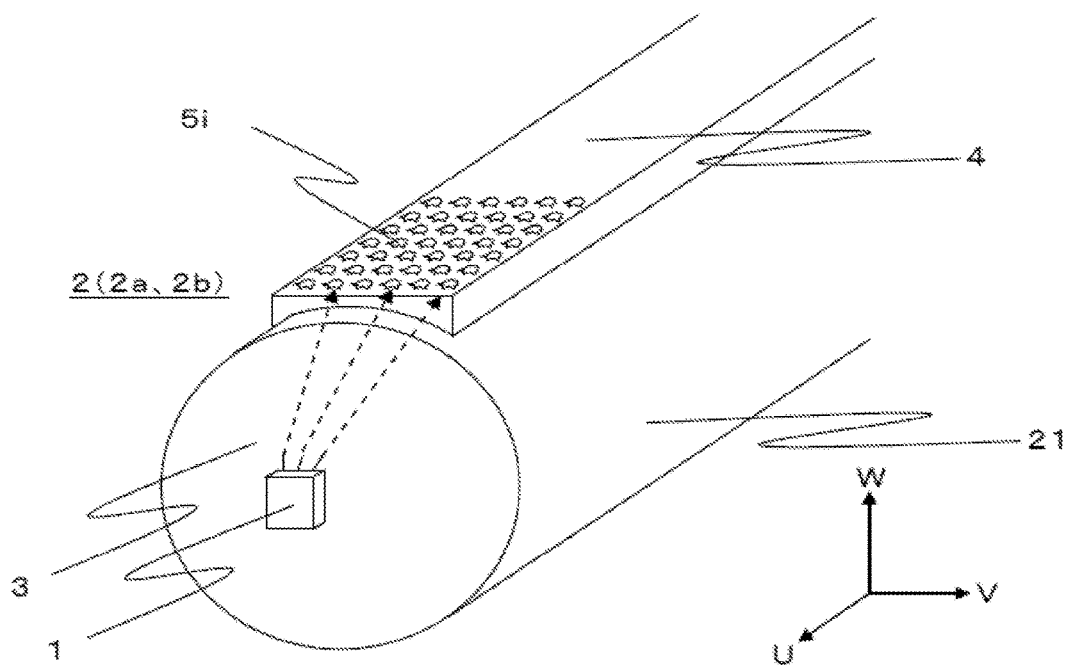
FIG. 30A is a tilted perspective view of the light guide body 2 according to Embodiment 3.
Figure 30B:
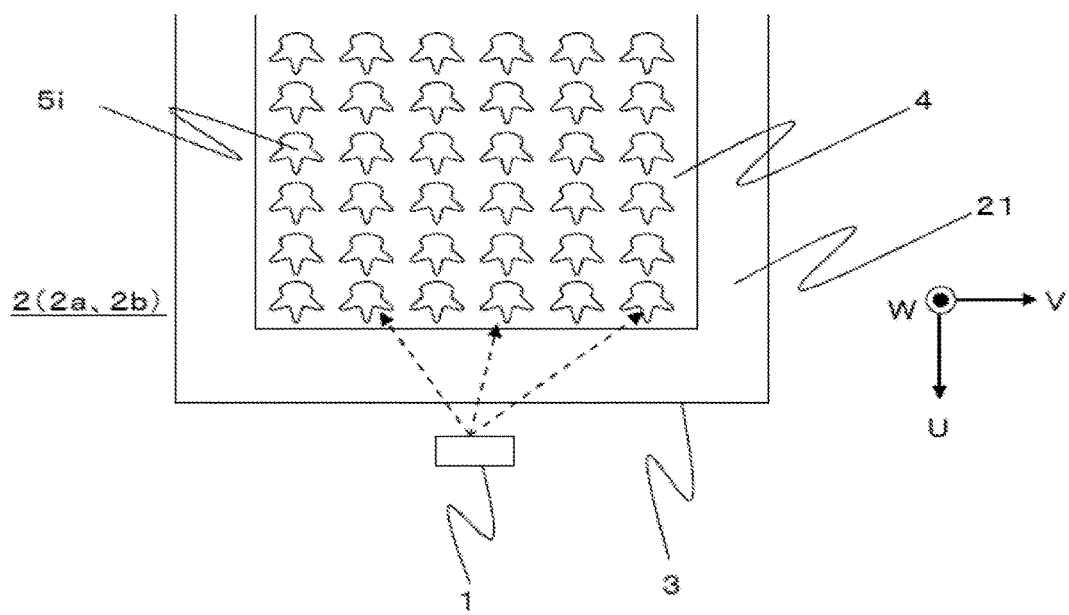
FIG. 30B is an upper surface view of the light guide body 2 according to Embodiment 3.

FIGS. 27 to 30 are used for description of the image reading device 11 according to Embodiment 3. FIG. 27 is a cross-sectional drawing of the image reading device 11 according to Embodiment 3. FIG. 28 is a tilted perspective view of a microstructure 5i according to Embodiment 3. FIG. 29 is a tilted perspective view of a microstructure 5j according to Embodiment 3. FIG. 30 is a tilted perspective view and an upper surface view of the light guide body 2 according to Embodiment 3. In the image reading device 11 according to Embodiment 1, light from the light source elements 1 placed in the vicinity of both lengthwise-direction end portions 3 of the light guide body 2 enters the light guide body 2 from both end portions 3. On the other hand, in the image reading device 11 according to Embodiment 3, a single-sided light source device configuration is used in which, as in FIG. 27, the light source element 1 is arranged only in the vicinity of one end portion 3 of the light guide body 2, and light enters the light guide body 2 only from the end portion 3 of the side at which the light source element 1 is arranged. A single-sided light source image reading device 18a is the reflection-side single-sided light source image reading device 18a, and a single-sided light source image reading device 18b is the transmission-side single-sided light source image reading device 18b.

The radial microstructure according to Embodiment 3 is described below. In Embodiment 1, as illustrated in FIGS. 5 to 15, a shape is used in which protruding parts along the entire circumference extend radially, centered on a reference axis as the origin point, taking the reference axis to be a straight line perpendicular to the band region 4. On the other hand, according to Embodiment 3, the radial microstructure, as illustrated in FIGS. 28 and 29, has a shape in which three protruding parts extend radially from the center within a semicircle. Further, the number of protruding parts may be any number greater than or equal to three.

In the case in which the incident direction of light entering the light guide main body 21 included in the light guide body 2 passes through the lengthwise direction (X-axis direction) center of the light guide body 2 in FIGS. 1 and 2 and there is symmetry relative to a plane parallel to the Y-Z plane, the radial microstructure preferably has a shape that has point symmetry relative to the intersection point of the band region 4 and the reference axis, or has linear symmetry relative to a straight line parallel to the V axis, as illustrated in FIGS. 5 to 15. However, in a single-sided light source image reading device 18 that is configured by arrangement of the light source element 1 at one lengthwise direction end portion 3 of the light guide body 2 as illustrated in FIG. 27, there is no requirement to necessarily maintain symmetry of the radial microstructure. As illustrated in FIG. 30, this configuration has protruding parts only in the direction of the end portion 3 at which the light source element 1 is installed, and an effect that is the same as the effect obtained by the symmetrical microstructure can be obtained even by arrangement of the radial microstructures 5i and 5j as illustrated in FIGS. 28 and 29.

In Embodiment 3, the majority of the light from the light source element 1 entering the light guide main body 21 included in the light guide body 2, as illustrated in FIG. 30, enters the radial microstructures from the direction in which the protruding parts of the radial microstructure 5$i$ are located. Thus even though the shape of the microstructure is asymmetric, use of this configuration enables the obtaining of an effect that is similar to that of the radial microstructure 5 in Embodiment 1. A portion of the shape of the radial microstructure can be simplified in Embodiment 3, and this simplification has the effect of making molding of the light guide body 2 easy.

Embodiment 4

Figure 31A:
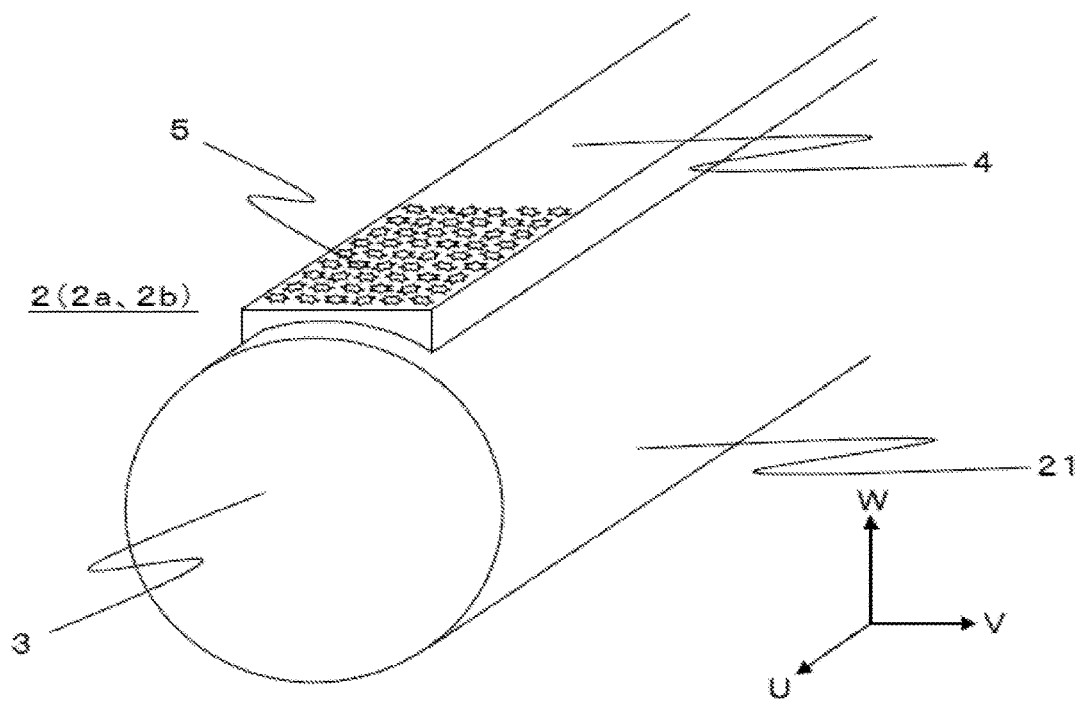
FIG. 31A is a tilted perspective view of the light guide body 2 according to Embodiment 4.
Figure 31B:
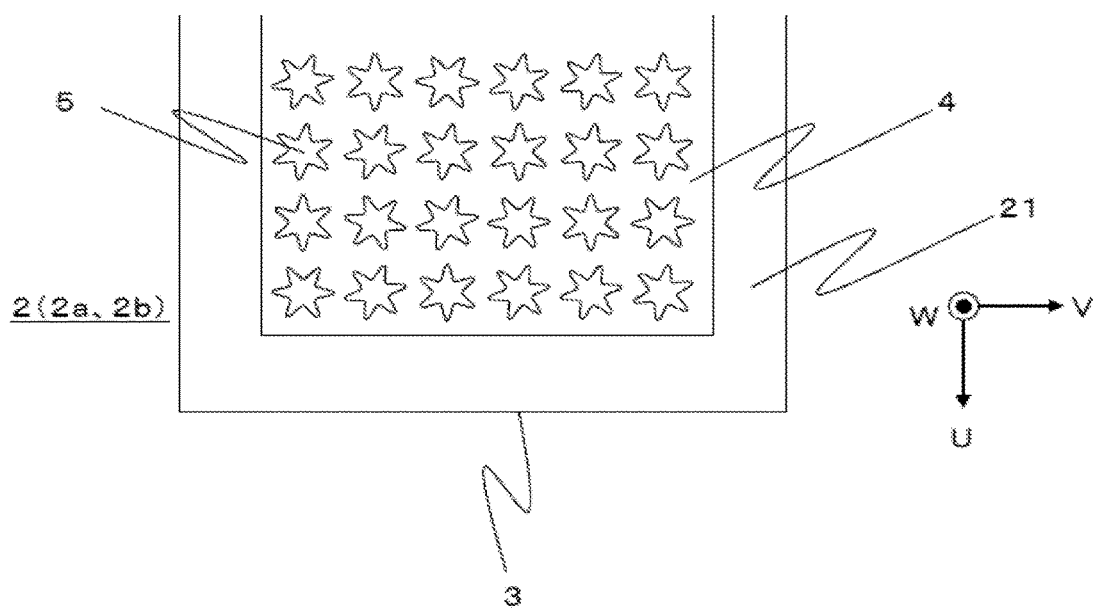
FIG. 31B is an upper surface view of the light guide body 2 according to Embodiment 4.

FIG. 31 is a tilted perspective view and an upper surface view of the light guide body 2 according to Embodiment 4. In Embodiments 1 to 3, the directions of the two-dimensional arrangement of the radial microstructures 5 in the band region 4 in each embodiment are aligned such that there is linear symmetry with respect to the lengthwise direction of the light guide body 2. However, as illustrated in FIG. 31, the two-dimensional arrangement of Embodiment 4 in the band region 4 allows rotation of a placement angle around an axis defined by the height direction and passing through the center of the bottom face of the radial microstructure 5.

Due to forming of the radial microstructure 5 of concavities or protuberances in the aforementioned manner, incident light strikes the different surfaces, and this enables the obtaining of emitted light that is more uniform. Further, due to arrangement such that the protruding part of a given radial microstructure 5 faces the interval between the protruding parts of the adjacent radial microstructure 5, the radial microstructures 5 can be arranged at higher density, and this has the effect of enabling an increase in the amount of light emitted from the light guide body 2.

Embodiment 5

Figure 32A:
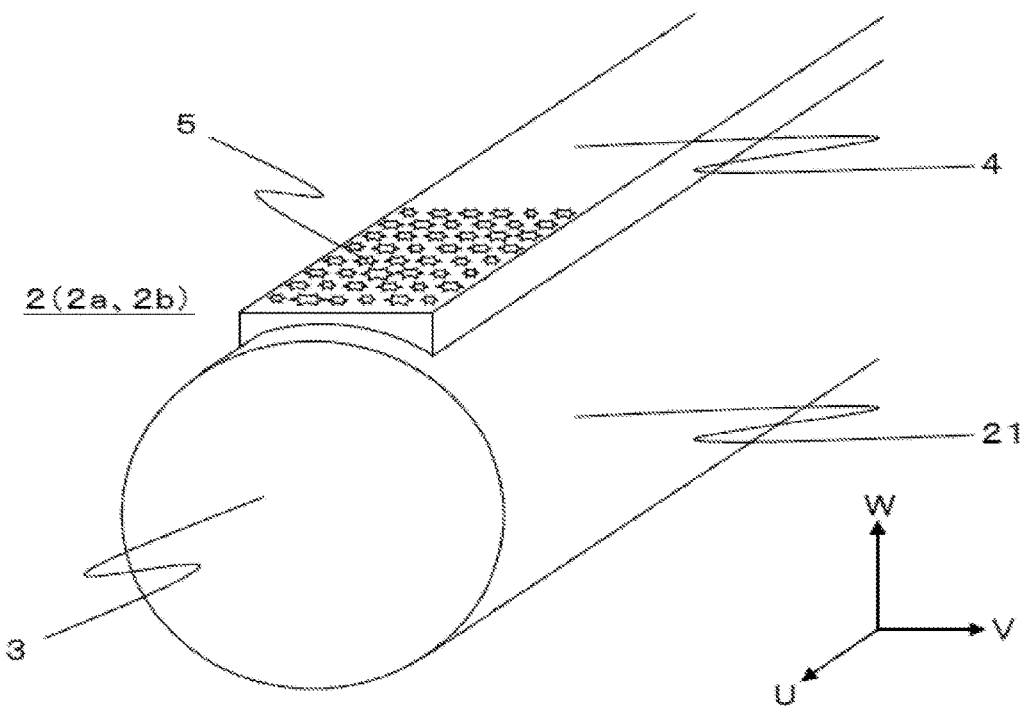
FIG. 32A is a titled perspective view of the light guide body 2 according to Embodiment 4.
Figure 32B:
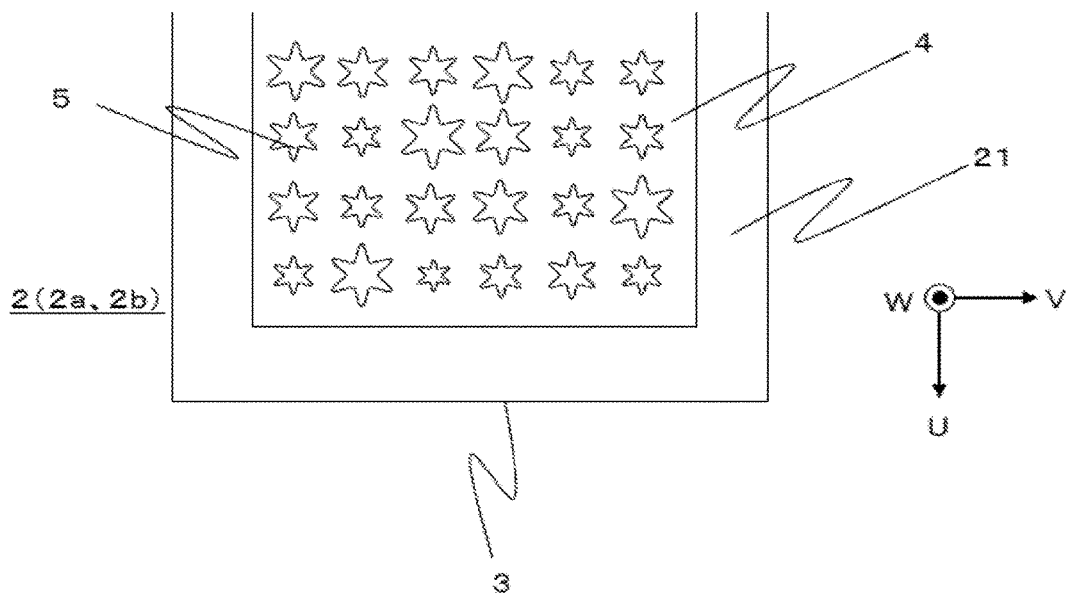
FIG. 32B is an upper surface view of the light guide body 2 according to Embodiment 4.

FIG. 32 is a tilted perspective view and an upper surface view of the light guide body 2 according to Embodiment 5. In Embodiments 1 to 4, the radial microstructures 5 of equal size are arranged two-dimensionally in the band region 4. However, as illustrated in FIG. 32, radial microstructures 5 having different sizes are arranged in Embodiment 5.

By forming the radial microstructures 5 having different sizes in the aforementioned manner, the angles and intensities of scatter light become more complex, and the obtained light emission has greater uniformity.

The foregoing embodiments are for the purpose of description, and are not intended to limit the scope of the present description. The scope of the present description is indicated by the attached claims rather than the embodiments. Various modifications made within the scope of the claims or their equivalents are to be included within the scope of the present invention.

For example, although Embodiments 2 to 5 change the arrangement, shape, and/or size of the radial microstructures 5 in comparison to Embodiment 1, a configuration may be used that combines such changes. The examples of Embodiment 2 and 5 may be combined, and radial microstructures 5 having different sizes may be arranged in a zig-zag manner. This example is not limiting, and the radial microstructures 5 can be formed by freely selecting a combination of the examples of the embodiments.

Furthermore, although the light source element 1 is arranged only in the vicinity of either of the end portions 3 of the light guide body 2 in Embodiment 3, this arrangement is not limiting. Relative to the light guide body 2 in which are formed radial microstructures 5 of Embodiment 3 shaped such that the protruding parts extend within the semicircle from the center, the light source elements 1 may be arranged in the vicinities of both end portions 3 of the light guide body 2.

Further, although examples are described above in which radial microstructures 5 of the same shape are formed in the band region 4 as illustrated in FIG. 4, this configuration is not limiting. A configuration may be used that arranges a combination of the radial microstructures 5 having different shapes as illustrated in FIG. 5 to FIG. 15, FIG. 28, and FIG. 29. In such a configuration, an arrangement may be used that places radial microstructures 5 of the same shape together or randomly.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2015-031335, filed on Feb. 20, 2015, including the specification, claims, drawings, and abstract, the entire disclosure of which is incorporated by reference herein.

INDUSTRIAL APPLICABILITY

The present disclosure is applicable to, for example, a light guide body, a light source device, and an image reading device for use in a device such as a fax machine, copier, or financial terminal.

REFERENCE SIGNS LIST

1 Light source element
2 Light guide body
21 Light guide main body (main body)
2$a$ Light guide body (light guide body used for transmission light source)
2$b$ Light guide body (light guide body used for reflection light source)
3 End surface (end portion)
4 Band region
5 Radial microstructure (light reflection member)
51 Protruding section (protruding section of radial microstructure 5)
52 Recessed section (recessed section of radial microstructure 5)
53 Side section (side section of radial microstructure 5)
5$a$ Radial microstructure (light reflection member)
5$b$ Radial microstructure (light reflection member)
5$c$ Radial microstructure (light reflection member)
5$d$ Radial microstructure (light reflection member)
5$e$ Radial microstructure (light reflection member)
5$f$ Radial microstructure (light reflection member)
5$g$ Radial microstructure (light reflection member)
5$h$ Radial microstructure (light reflection member)
5$i$ Radial microstructure (light reflection member)
5$j$ Radial microstructure (light reflection member)
6 Cover member 6a Cover member (reflected light reading-side cover member)
6b Cover member (transmitted light reading-side cover member)
7 Board
7a Board (reflected light reading-side board)
7b Board (transmitted light reading-side board)
8 Line sensor unit (sensor IC)
8a Line sensor unit (reflected light reading-side sensor IC)
8b Line sensor unit (transmitted light reading-side sensor IC)
9 Imaging optical system (lens array unit)
9a Imaging optical system (reflected light reading-side lens array unit)
9b Imaging optical system (transmitted light reading-side lens array unit)
10 Light source element board
11 Image reading device
11a Image reading device (reflection-side image reading device)
11b Image reading device (transmission-side image reading device)
14 Signal processor (signal-processing IC)
14a CPU
14b RAM
14c Signal processing circuit
15 Light-source driving circuit
16 ASIC
17 A/D conversion circuit
18 Single-sided light source image reading device
18a Single-sided light source image reading device (reflection-side single-sided light source image reading device)
18b Single-sided light source image reading device (transmission-side single-sided light source image reading device)
105 Microstructure
205 Light scattering member
MM Reading target object

The invention claimed is:

1. A light guide body comprising:
a columnar main body into which light enters from at least one end portion;
a band region portion formed extending in a lengthwise direction in a portion of a circumferential surface of the main body; and
a plurality of light reflection members arranged in the band region portion, each light reflection member of the plurality of light reflection members being formed by a microstructure,
wherein
the microstructure comprises protruding parts extending radially in at least three directions from a reference point in the band region portion, the reference point being an intersection of the band region portion and a reference axis that is a straight line perpendicular to the band region portion,
the microstructure has cross sections including a first cross section and a second cross section, each cross section being in a plane including the reference axis,
the first cross section intersects a bottom portion disposed between two adjacent protuberance parts,
the second cross section intersects an apex portion that extends radially,
a slope of a profile of the microstructure in the first cross section is steeper than a slope of a profile of the microstructure in the second cross section in the protruding parts, and in the first cross section and the second cross section, a distance between the profile of the microstructure and a plane of the band region portion external to the microstructure increases with nearness to the reference point.

2. The light guide body according to claim 1, wherein a shape of the light reflection member of the plurality of light reflection members
is symmetric relative to the reference point, or
is symmetric relative to a straight line passing through the reference point, the straight line being perpendicular to the lengthwise direction and to another straight line passing through the reference point and perpendicular to the band region portion.

3. The light guide body according to claim 1, wherein the light reflection member of the plurality of light reflection members has a six-pointed star conical shape.

4. The light guide body according to claim 1, wherein a size of some of the plurality of light reflection members is different from the size of others of the plurality of light reflection members.

5. The light guide body according to claim 1, wherein the light reflection members comprise:
light reflection members formed by protruding sections protruding from the circumferential surface of the main body, or
light reflection members formed by recessed sections recessed into the circumferential surface of the main body.

6. The light guide body according to claim 1, wherein the light reflection members are disposed in the band region as:
light reflection members formed by protruding sections protruding from the circumferential surface of the main body, and
light reflection members formed by recessed sections recessed into the circumferential surface of the main body.

7. An image reading device comprising:
the light guide body according to claim 1;
a light source element facing the end portion of the light guide body, and
an imaging optical system to focus on a photoreceptor element light emitted from a portion opposing the band region portion of the circumferential surface of the light guide body and reflected by a reading target object or transmitted through the reading target object.

8. A light guide body comprising:
a columnar main body into which light enters from at least one end portion;
a band region portion formed extending in a lengthwise direction in a portion of a circumferential surface of the main body; and
a plurality of light reflection members arranged in the band region portion, each light reflection member of the plurality of light reflection members being formed by a microstructure, wherein
the microstructure comprises protruding parts extending radially in at least three directions from a reference point in the band region portion, the reference point being an intersection of the band region portion and a reference axis that is a straight line perpendicular to the band region portion,
the microstructure has cross sections including a first cross section and a second cross section, each cross section being in a plane including the reference axis,
the first cross section intersects a bottom portion disposed between two adjacent protuberance parts, the second cross section intersects an apex portion that extends radially, a slope of a profile of the microstructure in the first cross section is steeper than a slope of a profile of the microstructure in the second cross section in the protruding parts, in the first cross section and the second cross section, a distance between the profile of the microstructure and a plane of the band region portion external to the microstructure increases with nearness to the reference point, and a number of the protruding parts of the microstructure of some of the plurality of light reflection members is different from the number of the protruding parts of the microstructure of others of the plurality of light reflection members.

9. The light guide body according to claim 8, wherein a shape of the light reflection member of the plurality of light reflection members is symmetric relative to the reference point, or is symmetric relative to a straight line passing through the reference point, the straight line being perpendicular to the lengthwise direction and to another straight line passing through the reference point and perpendicular to the band region portion.

10. The light guide body according to claim 8, wherein a size of some of the plurality of light reflection members is different from the size of others of the plurality of light reflection members.

11. The light guide body according to claim 8, wherein the light reflection members comprise:

light reflection members formed by protruding sections protruding from the circumferential surface of the main body, or light reflection members formed by recessed sections recessed into the circumferential surface of the main body.

12. The light guide body according to claim 8, wherein the light reflection members are disposed in the band region as:

light reflection members formed by protruding sections protruding from the circumferential surface of the main body, and light reflection members formed by recessed sections recessed into the circumferential surface of the main body to a direction perpendicular to the band region portion.

13. An image reading device comprising:

the light guide body according to claim 8;

a light source element facing the end portion of the light guide body, and an imaging optical system to focus on a photoreceptor element light emitted from a portion opposing the band region portion of the circumferential surface of the light guide body and reflected by a reading target object or transmitted through the reading target object.

14. A light guide body comprising:

a columnar main body into which light enters from at least one end portion;

a band region portion formed extending in a lengthwise direction in a portion of a circumferential surface of the main body; and a plurality of light reflection members arranged in the band region portion, each light reflection member of the plurality of light reflection members being formed by a microstructure, wherein the microstructure comprises protruding parts extending radially from a reference point in the band region portion, the reference point being an intersection of the band region portion and a reference axis that is a straight line perpendicular to the band region portion, the microstructure has cross sections including a first cross section and a second cross section, each cross section being in a plane including the reference axis, the first cross section intersects a bottom portion disposed between two adjacent protuberance parts, the second cross section intersects an apex portion that extends radially, a slope of a profile of the microstructure in the first cross section is steeper than a slope of a profile of the microstructure in the second cross section in the protruding parts, in the first cross section and the second cross section, a distance between the profile of the microstructure and a plane of the band region portion external to the microstructure increases with nearness to the reference point, and the light reflection member of the plurality of light reflection members has a six-pointed star conical shape.

15. The light guide body according to claim 14, wherein a size of some of the plurality of light reflection members is different from the size of others of the plurality of light reflection members.

16. The light guide body according to claim 14, wherein the light reflection members comprise:

light reflection members formed by protruding sections protruding from the circumferential surface of the main body, or light reflection members formed by recessed sections recessed into the circumferential surface of the main body.

17. The light guide body according to claim 14, wherein the light reflection members are disposed in the band region as:

light reflection members formed by protruding sections protruding from the circumferential surface of the main body, and light reflection members formed by recessed sections recessed into the circumferential surface of the main body to a direction perpendicular to the band region portion.

18. An image reading device comprising:

the light guide body according to claim 14;

a light source element facing the end portion of the light guide body, and an imaging optical system to focus on a photoreceptor element light emitted from a portion opposing the band region portion of the circumferential surface of the light guide body and reflected by a reading target object or transmitted through the reading target object.

* * * * *